US009955357B2

(12) United States Patent
Moon et al.

(10) Patent No.: US 9,955,357 B2
(45) Date of Patent: Apr. 24, 2018

(54) SCHEME FOR COMMUNICATION IN MOBILE COMMUNICATION SYSTEM USING UNLICENSED FREQUENCY BAND

(71) Applicant: Samsung Electronics Co., Ltd., Suwon-si, Gyeonggi-do (KR)

(72) Inventors: Jung-Min Moon, Suwon-si (KR); Sun-Heui Ryoo, Yongin-si (KR); Sung-Jin Lee, Bucheon-si (KR); Jung-Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/839,164

(22) Filed: Aug. 28, 2015

(65) Prior Publication Data

US 2016/0066195 A1    Mar. 3, 2016

(30) Foreign Application Priority Data

Sep. 1, 2014 (KR) .................. 10-2014-0115658

(51) Int. Cl.
*H04W 72/00* (2009.01)
*H04W 16/14* (2009.01)
(Continued)

(52) U.S. Cl.
CPC ............. *H04W 16/14* (2013.01); *H04L 5/006* (2013.01); *H04L 5/0085* (2013.01);
(Continued)

(58) Field of Classification Search
CPC .................................................. H04W 16/14
(Continued)

(56) References Cited

U.S. PATENT DOCUMENTS 7,363,008 B2   4/2008   Hassan et al.
8,126,473 B1   2/2012   Kim et al.
(Continued)

OTHER PUBLICATIONS

"Part 11: Wireless LAN Medium Access Control (MAC) and Physical Layer (PHY) Specifications", IEEE Standards Association, Mar. 29, 2012, New York, USA.
(Continued)

*Primary Examiner* — Fabricio R Murillo Garcia
(74) *Attorney, Agent, or Firm* — Jefferson IP Law, LLP

(57) ABSTRACT

The present disclosure relates to a pre-5$^{th}$-Generation (5G) or 5G communication system provided for supporting higher data rates Beyond 4$^{th}$-Generation (4G) communication system such as Long Term Evolution (LTE). A method for adding an operating channel for a user equipment (UE) that uses an unlicensed band channel by an evolved Node B (eNB) in a mobile communication system is provided. The method includes transmitting a first sensing indicator message indicating sensing of an unlicensed band channel, to at least one UE, determining a channel state by sensing the unlicensed band channel, receiving a first feedback message including a channel sensing result of the unlicensed band channel sensed by the UE, from the at least one UE, comparing the determined channel state with the channel sensing result received from the UE, and transmitting a control message indicating addition of the unlicensed band channel to the UE based on the comparison result.

14 Claims, 24 Drawing Sheets

(51) Int. Cl.
*H04W 72/04* (2009.01)
*H04W 76/04* (2009.01)
*H04L 27/00* (2006.01)
*H04L 5/00* (2006.01)
*H04W 88/02* (2009.01)

(52) U.S. Cl.
CPC ........ *H04L 5/0091* (2013.01); *H04L 27/0006* (2013.01); *H04W 72/0453* (2013.01); *H04W 76/046* (2013.01); *H04L 5/0023* (2013.01); *H04L 5/0048* (2013.01); *H04L 5/0057* (2013.01); *H04W 88/02* (2013.01)

(58) Field of Classification Search
USPC ........................................................ 455/454
See application file for complete search history.

(56) References Cited

U.S. PATENT DOCUMENTS

| | | | |
|---|---|---|---|
| 8,565,178 B2 | 10/2013 | Cheng et al. | |
| 8,767,666 B2 | 7/2014 | Cheng et al. | |
| 2005/0095986 A1 | 5/2005 | Hassan et al. | |
| 2012/0113918 A1* | 5/2012 | Freda | H04W 72/1205 370/329 |
| 2012/0307748 A1 | 12/2012 | Cheng et al. | |
| 2013/0336156 A1* | 12/2013 | Wei | H04L 5/001 370/252 |
| 2013/0343288 A1 | 12/2013 | Ratasuk et al. | |
| 2014/0023022 A1 | 1/2014 | Cheng et al. | |
| 2014/0199992 A1* | 7/2014 | Chincholi | H04W 16/14 455/422.1 |
| 2014/0254524 A1 | 9/2014 | Cheng et al. | |
| 2015/0215952 A1* | 7/2015 | Hinman | H04W 72/085 370/252 |
| 2015/0223077 A1* | 8/2015 | Fan | H04W 16/14 370/312 |
| 2015/0256303 A1* | 9/2015 | Belghoul | H04L 5/006 370/329 |
| 2016/0007350 A1* | 1/2016 | Xiong | H04W 24/10 370/252 |
| 2016/0014610 A1* | 1/2016 | Wong | H04W 16/14 455/454 |
| 2017/0141859 A1* | 5/2017 | Seo | H04B 17/345 |

OTHER PUBLICATIONS

Huawei, "Coexistence of WAN and D2D", 3GPP TSG RAN WG1 Meeting#78, Aug. 18-22, 2014, Dresden, Germany.
LG Electronics, "Other Remaining Issues for D2D and WAN Co-Existence", 3GPP TSG RAN WG1 Meeting#78, Aug. 18-22, 2014, Dresden, Germany.

* cited by examiner

SCHEME FOR COMMUNICATION IN MOBILE COMMUNICATION SYSTEM USING UNLICENSED FREQUENCY BAND

CROSS-REFERENCE TO RELATED APPLICATION(S)

This application claims the benefit under 35 U.S.C. § 119(a) of a Korean patent application filed in the Korean Intellectual Property Office on Sep. 1, 2014 and assigned Serial number 10-2014-0115658, the entire disclosure of which is hereby incorporated by reference.

TECHNICAL FIELD

The present disclosure relates to a method for communication in a mobile communication system using an unlicensed frequency band. More particularly, the present disclosure relates to a method for efficiently sharing resources with other wireless communication devices that use the same unlicensed frequency band by a mobile communication system that operates in an unlicensed frequency band.

BACKGROUND

To meet the demand for wireless data traffic having increased since deployment of 4G (4th-Generation) communication systems, efforts have been made to develop an improved 5G ($5^{th}$-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation, and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Currently, a series of studies to operate a long term evolution (LTE) system in an unlicensed frequency band have been conducted. The LTE system operating in the unlicensed frequency band is referred to as an LTE-unlicensed (LTE-U) or unlicensed LTE system.

The unlicensed frequency band is not a frequency band that is allocated only for a specific system. Therefore, if an arbitrary communication system is allowed to use an unlicensed frequency band by a regulatory agency, such as Federal Communications Commission (FCC), and complies with the rules established by the regulatory agency, the communication system may perform communication by transmitting and receiving wireless signals through the unlicensed frequency band. Wi-Fi or Bluetooth, which is currently used by many people, corresponds to the typical technology using the unlicensed frequency band.

Currently, with the significant increase in mobile data traffic through LTE or LTE-advanced (LTE-A), carriers or communication service providers have shown a great interest in securing the frequency band capable of accommodating the increasing mobile data traffic. The most basic way to do this is to purchase a licensed frequency band that is allocated for the LTE system. However, since frequency resources are public resources that are strictly managed and controlled by the government, purchasing the licensed frequency band requires a lot of time and cost, and the complicated procedures. Therefore, some carriers and communication chip makers have shown their intentions to operate the LTE system in the unlicensed frequency band near 5 GHz. It is known that in the 5 GHz band, the LTE system can utilize a wide frequency band of about 500 MHz. Therefore, if the unlicensed frequency band of 5 GHz is effectively utilized, it is expected to significantly increase the capacity of the LTE system.

However, the unlicensed frequency band near 5 GHz may be used not only by the LTE system but also by other communication systems (typically, the Wi-Fi system). Therefore, the consideration for allowing the LTE system not to damage other communication systems while complying with all the regulations that the LTE system should comply with in the unlicensed frequency band should be reflected in the LTE-U system.

If the LTE system operates in the unlicensed frequency band, the performance of the Wi-Fi system that has been using the unlicensed frequency band cannot but be deteriorated. This is because despite the limited frequency bandwidth, the number of wireless communication devices desiring to use the unlicensed frequency band increases. However, if the LTE-U system causes additional performance degradation of the Wi-Fi system in addition to the performance degradation due to the increase in the number of communication devices, this may be a factor to hinder the introduction of the LTE-U system. Therefore, the LTE-U system should be designed considering not only its own performance but also the performance of other wireless communication devices that use the same frequency band, such as the Wi-Fi system.

FIG. 1 illustrates a carrier sense multiple access/collision avoidance (CSMA/CA) basic operation in a media access control (MAC) protocol of a Wi-Fi system according to the related art.

Referring to FIG. 1, the basic MAC protocol and performance degradation factors of Wi-Fi will be described. The MAC protocol of Wi-Fi typically uses CSMA/CA.

If a wireless local area network (WLAN) transmitter 1 (WLAN TX 1) transmits data 100 to a WLAN receiver 1 (WLAN RX 1) using a specific channel, the RX 1 may transmit an acknowledgement (ACK) 104 to the TX 1 in the channel after a time of short interframe space (SIFS) 102.

At this point, if a nearby TX (e.g., WLAN TX 2) senses (or detects) the channel and determines that the channel is in a busy state, the nearby TX may not transmit data, deferring an access to the channel as shown by reference numeral 106. On the other hand, as a result of the sensing (or detection), if the TX 2 determines that the channel is in an idle state, the TX 2 may start backoff 110 after a time of distributed coordination function (DCF) interframe space (DIFS) 108, recognizing that the data transmission of the TX 1 is terminated. The backoff is an operation in which a transmitter chooses a backoff number having a value within a certain range and waits for a time corresponding to the chosen backoff number. In other words, a transmitter that has chosen the smallest backoff number through the backoff operation may first perform transmission.

The TX 2 that has chosen the smallest backoff number in the backoff process may transmit data 112 over the channel, and other nearby TX may wait without transmitting data, determining that the channel is in the busy state.

The backoff number is determined as an arbitrary integer between 1 and a contention window (CW), and a binary exponential backoff algorithm may be used in which a value of the CW is doubled each time data transmission is failed due to occurrence of collision.

When CSMA/CA is used in Wi-Fi, performance degradation may occur due to the following factors.

In a first case, after sensing an idle channel, a plurality of TXs choose the same backoff number in the backoff process, and perform transmission at the same time. In this case, the signals transmitted from the plurality of TXs may interfere with each other, making it difficult to successfully transmit and receive the signals.

In a second case, although a transmitting terminal has performed transmission as the transmitting terminal determines that the channel is in the idle state, when performing channel sensing (or channel detection), the channel may be in the busy state, for a receiving terminal. This case may mainly occur when a hidden node in view of a TX (i.e., another TX out of the sensing area (or detection area) of the TX) is performing transmission. The second factor is generally referred to as a hidden node issue.

In Wi-Fi, the TX and the RX may address the hidden node issue by using a request to send (RTS) and a clear to send (CTS), respectively.

FIG. 2 illustrates a hidden node issue of a Wi-Fi system according to the related art.

Referring to FIG. 2, when a TX A 200 is transmitting data to an RX 1 202 over a specific channel, a nearby TX B 204 may not determine whether the TX A 200 out of its own sensing area is presently performing transmission. In other words, the TX B 204 may fail in sensing the state of the specific channel as a busy state as shown by reference numeral 208. If the TX B 204 senses, as an idle state, the state of the channel that the TX A 200 is transmitting, and transmits data to the RX 1 202 in the channel as shown by reference numeral 206, the RX 1 202 may receive signals from both of the TX A 200 and the TX B 204. Therefore, the signals from the TX A 200 and the TX B 204 may act as interference to each other, making it difficult to successfully transmit and receive the signals.

FIG. 3 illustrates a solution to a hidden node issue through RTS and CTS in a Wi-Fi system according to the related art.

Referring to FIG. 3, the TX A 200 may inform its nearby nodes (TXs or RXs) that the TX A 200 will transmit data to the RX 1 202, by transmitting RTS 300 before transmitting the data. Further, upon receiving the RTS 300, the RX 1 202 may inform its nearby nodes that the RX 1 202 will receive data from the TX A 200 in the future, by transmitting CTS 302. Therefore, the nearby nodes that have receive the RTS 300 or the CTS 302 may not perform data transmission until the data transmission/reception between the TX A 200 and the RX 1 202 is terminated. By receiving the CTS 302, the TX B 204 may also stop or delay the transmission. In this way, the Wi-Fi system may address the hidden node issue by using the RTS or CTS.

However, the LTE-U system shows another type of the hidden node issue, which is different from that of the Wi-Fi system.

FIG. 4 illustrates a transmission frame structure for a description of a transmission operation by channel sensing in an LTE-U system implementing carrier aggregation (CA) using an unlicensed frequency band according to the related art.

Referring to FIG. 4, in the LTE-U system implementing CA, a licensed band (or a licensed frequency band) may be used as a primary cell (PCell) or a primary carrier 400, and an unlicensed band (or an unlicensed frequency band) may be used as a secondary cell (SCell) or a secondary carrier 410.

An evolved Node B (eNB) may schedule user equipment (UE) transmission in the SCell 410 through the PCell 400. In other words, the UE may be allocated uplink transmission resources in the SCell 410 through the PCell 400.

In the unlicensed band (such as the SCell 410), a TX may sense a channel, and transmit data, if the TX determines a state of the channel as an idle state. For example, before transmitting downlink data 414 to the UE over a channel in the unlicensed band 410, the eNB may sense the channel as shown by reference numeral 412 to determine whether the channel is in the idle state. Further, the UE may sense the channel as shown by reference numeral 416 before transmitting uplink data 418 to the eNB over a channel in the unlicensed band 410.

Generally, the UE is allocated uplink transmission resources through the PCell 400, k subframes before the transmission time. If the UE senses that the allocated transmission resources are used for transmission 420 of a Wi-Fi device, the UE may not transmit uplink data even though the UE has reached the allocated uplink transmission period.

In the LTE-U system, in the case of downlink transmission, a TX is one eNB, but RX may be a plurality of UEs. The characteristics that a plurality of UEs exist may act as a cause of the occurrence of the hidden node issue, which does not exist in the Wi-Fi system, for the LTE-U system. In the Wi-Fi system, basically, one TX transmits data to one RX at a specific time. However, in a downlink of LTE-U, generally, one TX (i.e., an eNB) may transmit data to a plurality of RXs (i.e., UEs) at a specific time. Therefore, in LTE-U, the sensing results (or detection results) of TX and RX may be classified as shown in Table 1 below.

TABLE 1

| Case | Channel sensing result of eNB | Channel sensing result of UE | Remarks |
| --- | --- | --- | --- |
| 1 | Idle | All UEs are idle | Observed in Wi-Fi |
| 2 | Idle | All UEs are busy | Observed in Wi-Fi |
| 3 | Idle | Some UEs are idle Some UEs are busy | Newly occur in LTE-U |
| 4 | Busy | All UEs are idle | Observed in Wi-Fi |
| 5 | Busy | All UEs are busy | Observed in Wi-Fi |
| 6 | Busy | Some UEs are idle Some UEs are busy | Newly occur in LTE-U |

In Case 6 shown in Table 1, it is a situation that newly occurs in LTE-U. However, since an eNB which is a TX has sensed the channel state as a busy state, downlink transmission is not performed (so the hidden node issue may not occur). Therefore, in Case 6, there is no need to define additional operations of the eNB.

On the other hand, in Case 3 shown in Table 1, since the eNB has sensed the channel state as an idle state, the condition that the eNB can transmit data, has been met. However, since some UEs among the UEs scheduled by the eNB have sensed the channel state as an idle state and some other UEs have sensed the channel state as a busy state, some UEs that have sensed the channel state as a busy state may have failed to meet the condition that the UEs can receive data. In other words, since some UEs that have sensed the channel state as a busy state may be communicating with a hidden node, the UEs may fail to correctly receive a downlink signal from the eNB.

Therefore, it is necessary to define how the eNB should operate to address the issue that may occur in the LTE-U system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for effectively solving a hidden node issue in an LTE-U system operating in an unlicensed band.

Another aspect of the present disclosure is to provide a method for adding an operating channel without a hidden node issue in a mobile communication system operating in an unlicensed band.

Another aspect of the present disclosure is to provide a scheduling method for efficiently using resources according to the channel sensing (or channel detection)/measurement results of a UE operating in an unlicensed band.

Another aspect of the present disclosure is to provide a method for efficiently controlling transmission power of an added channel in an unlicensed band.

In accordance with an aspect of the present disclosure, a method for adding an operating channel for a user equipment (UE) that uses an unlicensed band channel by an evolved Node B (eNB) in a mobile communication system is provided. The method includes transmitting a first sensing indicator message indicating sensing of an unlicensed band channel, to at least one UE, determining a channel state by sensing the unlicensed band channel, receiving a first feedback message including a channel sensing result of the unlicensed band channel sensed by the UE, from the at least one UE, comparing the determined channel state with the channel sensing result received from the UE, and transmitting a control message indicating addition of the unlicensed band channel to the UE based on a result of the comparison.

In accordance with another aspect of the present disclosure, a method for adding an operating channel for a UE that uses an unlicensed band channel by the UE in a mobile communication system is provided. The method includes receiving a first sensing indicator message indicating channel sensing for an unlicensed band channel from an evolved Node B (eNB), performing channel sensing in the unlicensed band channel based on the first sensing indicator message, transmitting a first feedback message including a channel sensing result of the unlicensed band channel, and receiving a control message indicating addition of at least one unlicensed band channel from the eNB.

In accordance with another aspect of the present disclosure, an eNB for adding an operating channel for a UE that uses an unlicensed band channel in a mobile communication system is provided. The eNB includes a controller configured to transmit a first sensing indicator message indicating sensing of an unlicensed band channel to at least one UE, determine a channel state by sensing the unlicensed band channel, receive a first feedback message including a channel sensing result of the unlicensed band channel sensed by the UE, from the at least one UE, compare the determined channel state with the channel sensing result received from the UE, and transmit a control message indicating addition of the unlicensed band channel to the UE based on a result of the comparison, and a transceiver configured to transmit and receive a signal or a message under control of the controller.

In accordance with yet another aspect of the present disclosure a UE for adding an unlicensed band channel in a mobile communication system is provided. The UE includes a controller configured to receive a first sensing indicator message indicating channel sensing for an unlicensed band channel from an evolved Node B (eNB), perform channel sensing in the unlicensed band channel based on the first sensing indicator message, transmit a first feedback message including a channel sensing result of the unlicensed band channel, and receive a control message indicating addition of at least one unlicensed band channel from the eNB, and a transceiver configured to transmit and receive a signal or a message under control of the controller.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
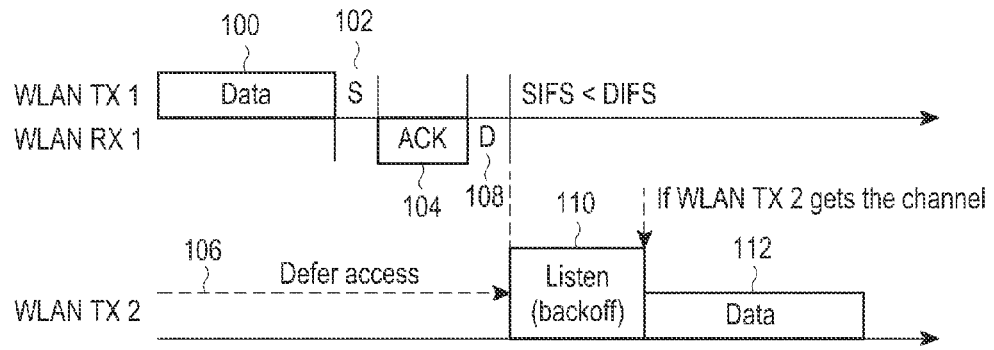
FIG. 1 illustrates a carrier sense multiple access/collision avoidance (CSMA/CA) basic operation in a media access control (MAC) protocol of a Wi-Fi system according to the related art.
Figure 2:
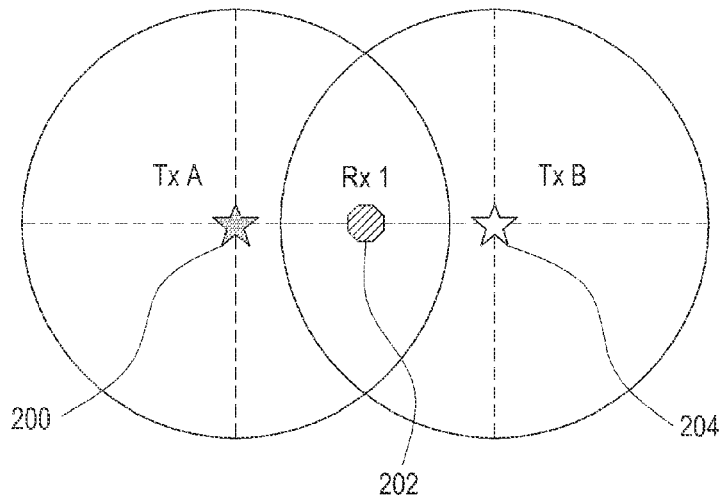
FIG. 2 illustrates a hidden node issue of a Wi-Fi system according to the related art.
Figure 2:
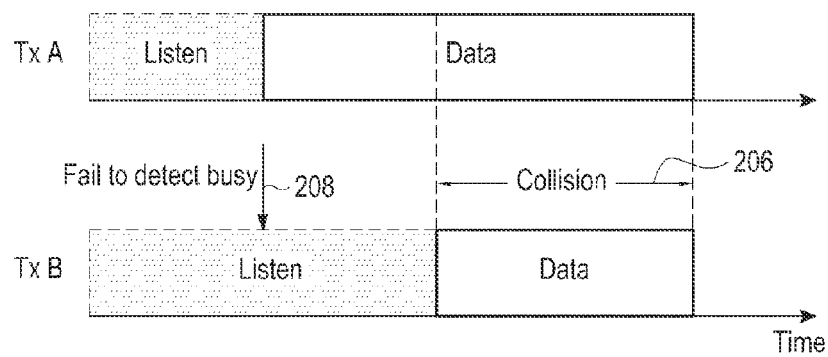
Figure 3:
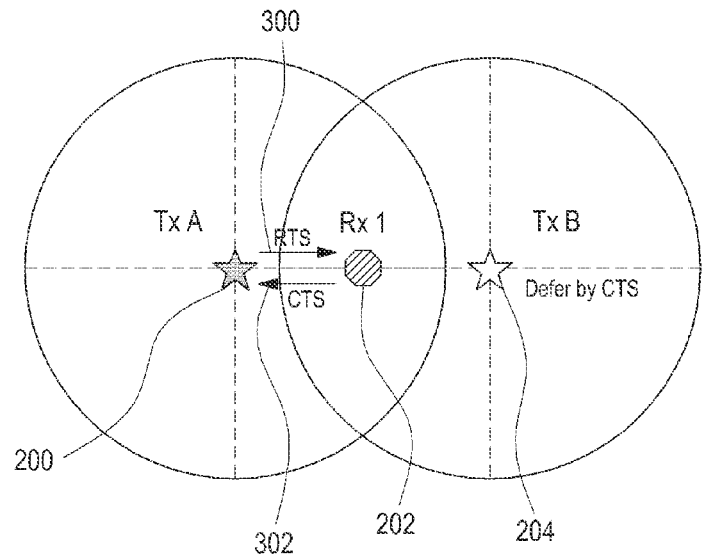
FIG. 3 illustrates a solution to a hidden node issue through request to send (RTS) and clear to send (CTS) in a Wi-Fi according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms "comprise" and/or "comprising" as herein used specify the presence of disclosed functions, operations, or components, but do not preclude the presence or addition of one or more other functions, operations, or components. It will be further understood that the terms "comprise" and/or "have," when used in this specification, specify the presence of stated features, integers, operations, elements, and/or components, but do not preclude the presence or addition of one or more other features, integers, operations, elements, components, and/or groups thereof.

As used herein, the term "A or B" or "at least one of A and/or B" includes any and all combinations of one or more of the associated listed items. For examples, "A or B" or "at least one of A or/and B" each may include A, or include B, or include both A and B.

Ordinal numbers as herein used, such as "first", "second", and the like, may modify various components of various embodiments of the present disclosure, but do not limit those components. For example, these terms do not limit the order and/or importance of the components. These terms are only used to distinguish one component from another. For example, a first user device and a second user device are different user devices from each other. For example, according to various embodiments of the present disclosure, a first component may be denoted a second component, and vice versa without departing from the scope of the present disclosure.

When a component is "connected to" or "coupled to" another component, the component may be directly connected or coupled to the other component, or other component(s) may intervene there between. In contrast, when a component is "directly connected to" or "directly coupled to" another component, no other intervening components may intervene there between.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Prior to a detailed description of the present disclosure, examples of interpretable meanings will be presented for some terms used herein. However, it should be noted that the terms used herein are not limited to the examples of interpretable meanings presented below.

In embodiments of the present disclosure, a base station, which is an entity that communicates with a terminal or any entity of the network, may be referred to as a base station (BS), a node B (NB), an evolved Node B (eNB), an access point (AP), and the like. In embodiments of the present disclosure, an eNB may be construed as an eNB (i.e., a long term evolution unlicensed (LTE-U) eNB) operating in an unlicensed band.

In embodiments of the present disclosure, a user equipment, which is an entity that communicates with a base station, may be referred to as a user equipment (UE), a mobile station (MS), a mobile equipment (ME), a device, a terminal, and the like. In embodiments of the present disclosure, a UE may be construed as a UE (i.e., an LTE-U UE) operating in an unlicensed band.

In embodiments of the present disclosure, since an LTE-U UE indicates an LTE UE operating in a licensed band and an unlicensed band by career aggregation (CA), the terms 'LTE-U UE' and 'LTE UE' may be interchangeably used. Similarly, in embodiments of the present disclosure, since the LTE-U eNB indicates an LTE eNB operating in the unlicensed band, the terms 'LTE-U eNB' and 'LTE eNB' may be interchangeably used.

According to an embodiment of the present disclosure, an operating frequency may be referred to as a channel, a cell, a carrier, and the like. In other words, in the CA scheme, a plurality of frequency bands may be used by the LTE system, and the frequency band may be referred to as a channel, a primary cell (PCell), a secondary cell (SCell), a carrier, and the like, in embodiments of the present disclosure.

Figure 5:
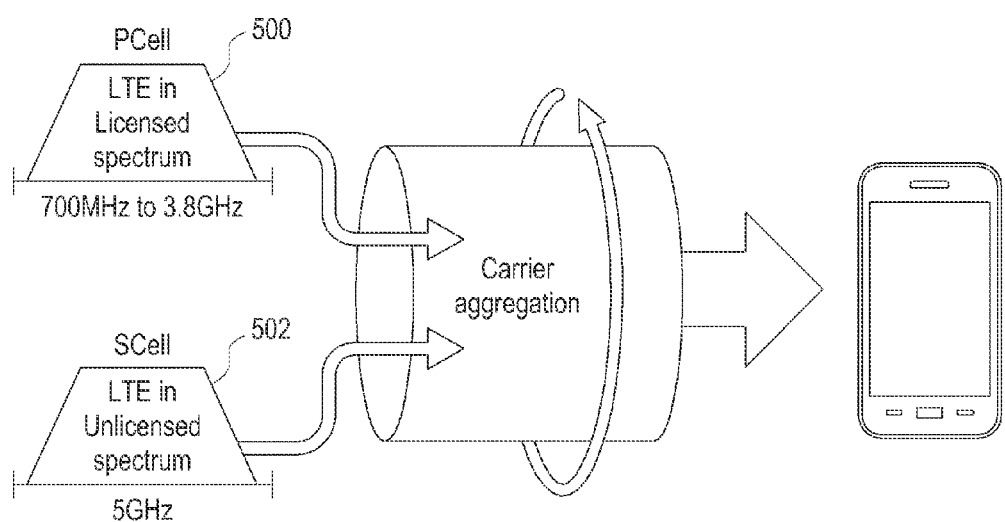
FIG. 5 illustrates a basic structure of CA, which is used in LTE-U according to an embodiment of the present disclosure.

In the present disclosure, 'channel sensing' may be interchangeably used as 'received signal strength indicator (RSSI) measurement' or 'channel detection'. FIG. 5 illustrates a basic structure of CA, which is used in LTE-U according to an embodiment of the present disclosure.

Referring to FIG. 5, the present disclosure considers an LTE-U system operating in an unlicensed frequency band. An eNB and a UE of the LTE-U system may simultaneously use a PCell 500 and an SCell 502 through CA. For example, the PCell 500 may operate in a licensed frequency band between 700 MHz and 3.8 GHz, and the SCell 502 may operate in an unlicensed frequency band of 5 GHz.

The data or control information requiring robust transmission/reception may be transmitted through the PCell 500 operating in the licensed frequency band, and the data that does not require high quality of service (QoS), such as best effort, (BE) may be transmitted through the SCell 502 operating in the unlicensed frequency band.

In this way, the LTE-U system using the unlicensed frequency band may provide enhanced user experience (UX) by using more resources. However, the LTE-U system should be designed so as not to interfere with communication of other communication systems, since the LTE-U system should coexist with the other communication systems (such as the Wi-Fi system) in the unlicensed frequency band.

An embodiment of the present disclosure focuses on Case 3 shown in Table 1 and cases derived from Case 3. In other words, the present disclosure focuses on operations of an eNB and a UE in a case where the channel sensing results of the eNB and the UE are different from each other. More specifically, a description will be made as to how the eNB and scheduled UEs should operate in a case where although the eNB has detected the channel state as an idle state, some of UEs scheduled by the eNB have detected the channel state as an idle state and some other UEs have detected the channel state as a busy state. In embodiments of the present disclosure, the state in which the channel sensing results between the scheduled UEs are different will be referred to as a partially busy state. Further, the present disclosure will focus on the downlink transmission.

Figure 6C:
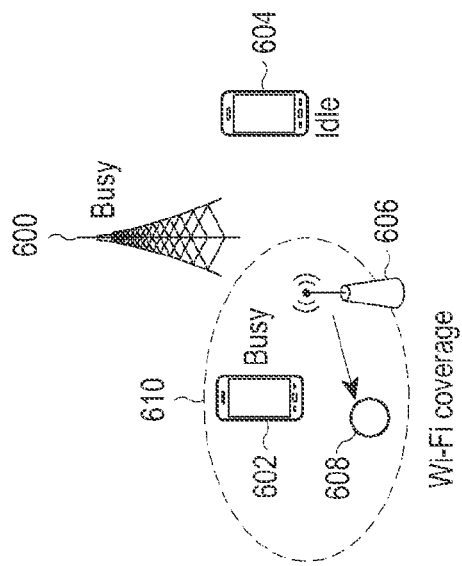
FIGS. 6A, 6B, and 6C illustrate a state of a channel that can occur in an LTE-U system according to an embodiment of the present disclosure.
Figure 6B:
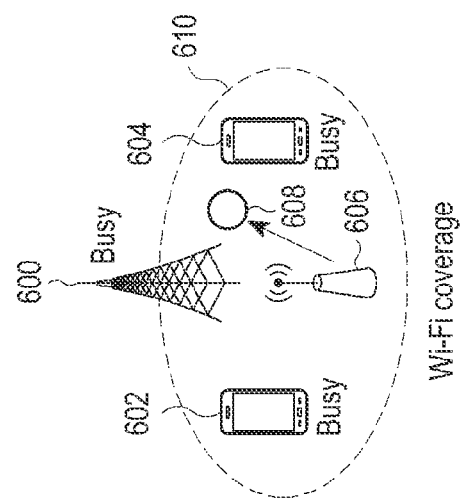
Figure 6A:
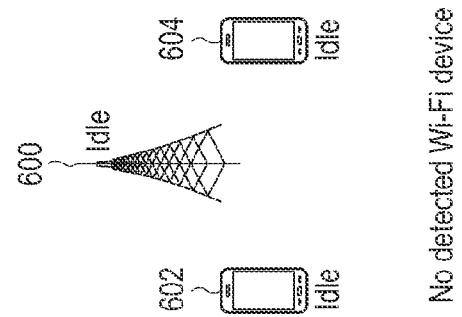

FIGS. 6A, 6B, and 6C illustrate a state of a channel that can occur in an LTE-U system according to an embodiment of the present disclosure.

Referring to FIG. 6A, no Wi-Fi communication device exist in the vicinity of an eNB 600, a UE1 602, and a UE2 604. In this case, all of the eNB 600, the UE1 602, and the UE2 604 may sense the channel state as an idle state.

Referring to FIG. 6B, a Wi-Fi AP 606 exists in the vicinity of the eNB 600, the UE1 602, and the UE2 604. The AP 606 is communicating with a Wi-Fi device 608 over the channel. In this case, all of the eNB 600, the UE1 602, and the UE2 604 existing in Wi-Fi coverage 610 of the AP 606 will sense the channel state as a busy state.

Referring to FIG. 6C, the Wi-Fi AP 606 exists in the vicinity of the UE1 602. The AP 606 is communicating with the Wi-Fi device 608 over the channel. While the UE1 602 existing in the Wi-Fi coverage 610 of the AP 606 will sense the channel state as a busy state, the eNB 600 and the UE2 604 existing out of the Wi-Fi coverage 610 will sense the channel state as an idle state. The case in which in this way, some of the UEs sense the channel state as an idle state and some other UEs sense the channel state as a busy state may correspond to the partially busy state.

Figure 7:
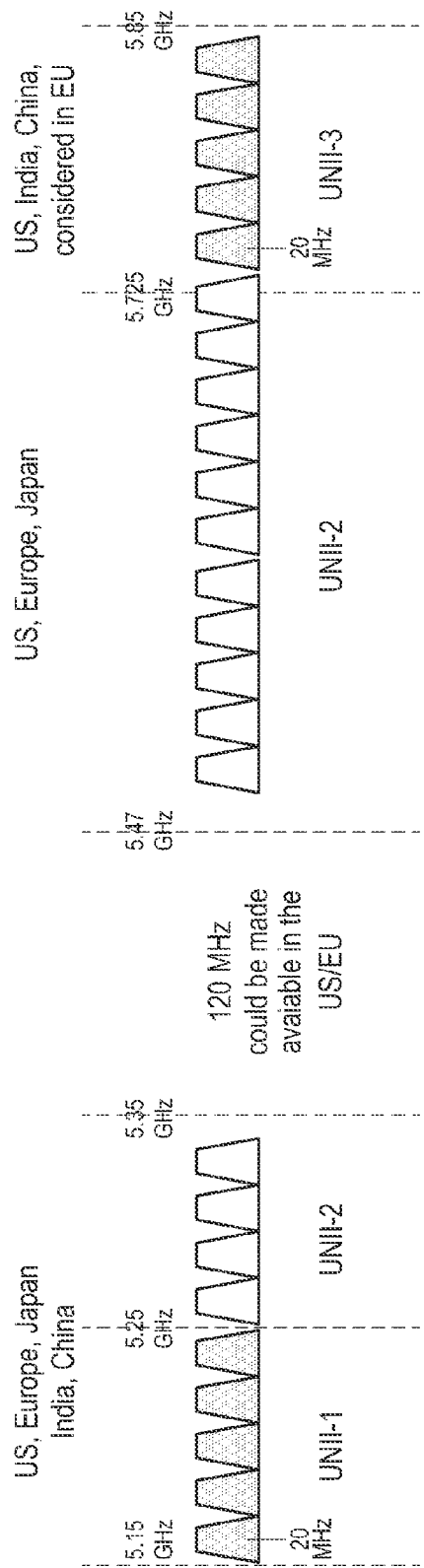
FIG. 7 illustrates a configuration of an unlicensed frequency band near 5 GHz according to an embodiment of the present disclosure.

FIG. 7 illustrates a configuration of an unlicensed frequency band near 5 GHz according to an embodiment of the present disclosure.

Referring to FIG. 7, a band of about 500 MHz can be used as an unlicensed frequency band in the vicinity of 5 GHz. Generally, an unlicensed band may include a plurality of channels having a 20 MHz bandwidth. A wireless communication device using an unlicensed band may select one or multiple channels among the plurality of channels, and operate using the selected channels. A plurality of channels near 5 GHz may form an unlicensed national information infrastructure (UNII) band differently depending on the country.

When selecting an operating frequency channel, the Wi-Fi system may select, as an operating channel, the channel having the lowest channel occupancy ratio among the available channels, considering the channel occupancy ratio of each channel. This is because selection of the channel having the lowest channel occupancy ratio fully increases the time in which the channel can be used. The channel occupancy ratio indicates a ratio of the time in which a magnitude of an interference signal is greater than or equal to a certain threshold, to the unit term, and may be referred to as a channel occupancy ratio of an interference signal.

The LTE-U system may consider a hidden node in addition to the method of considering the channel occupancy ratio of each channel in channel selection.

The partially busy state by a hidden node may be solved by the following three approach methods.

A first method is a channel selection method of an LTE-U eNB, a second method is a UE scheduling method of an LTE-U eNB by the help of a UE, and a third method is a transmission power control method of an LTE-U eNB.

The above three methods may be applied to different time ranges, and two or more of the three methods may be applied in combination. In other words, the first method regarding channel selection of an LTE-U eNB may be applied to a long-term range in which the operating frequency of the eNB is determined/changed, and the second method regarding scheduling of an LTE-U eNB by the help of a UE and the third method regarding transmission power control of an LTE-U eNB may be applied to a short-term range in which transmission/reception is performed between the eNB and the UE. The above three methods will be described below.

The present disclosure proposes the first method in which an eNB of the LTE-U system considers a hidden node when selecting a frequency at which the eNB will operate.

Prior to a description of the first method, a new operating frequency (i.e., an SCell) addition procedure of an eNB and a UE in the LTE system will be described in brief.

Figure 8:
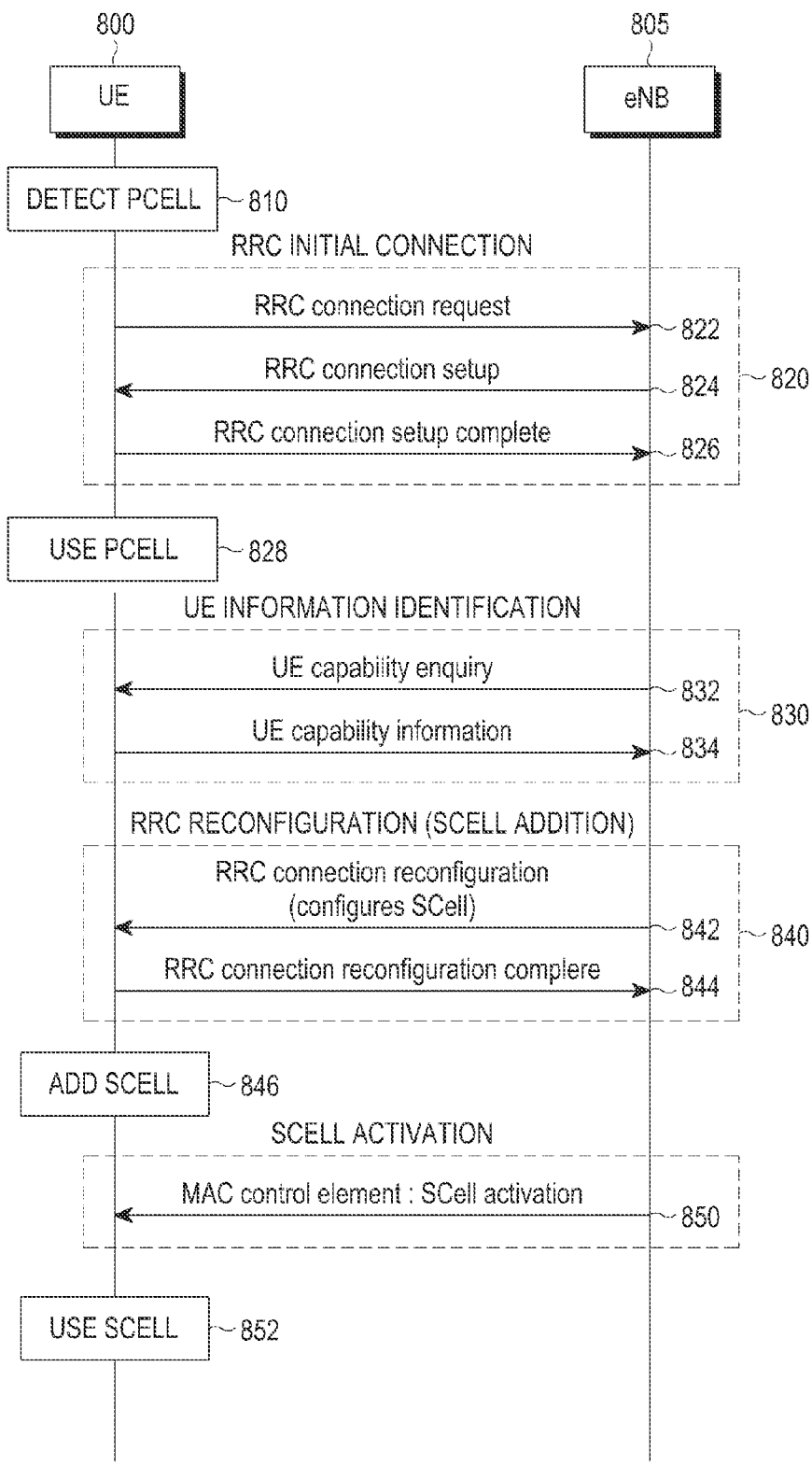
FIG. 8 illustrates a secondary cell (SCell) addition procedure of a long term evolution (LTE) system according to an embodiment of the present disclosure.

FIG. 8 illustrates an SCell addition procedure of an LTE system according to an embodiment of the present disclosure.

Referring to FIG. 8, a UE 800 may detect a PCell in operation 810, and perform an operation of radio resource control (RRC) initial connection with an eNB 805 in operation 820.

The operation 820 of RRC initial connection may include an operation 822 in which the UE 800 that has detected the PCell transmits an RRC connection request (RRCConnectionRequest) message to the eNB 805, an operation 824 in which the eNB 805 transmits an RRC connection setup (RRCConnectionSetup) message to the UE 800, and an operation 826 in which the UE 800 transmits an RRC connection setup complete (RRCConnectionSetupComplete) message to the eNB 805. Through the operation 820 of RRC initial connection the UE 800 may add and use the PCell as an operating frequency in operation 828.

The eNB 805 may obtain capability information of the UE 800 by performing a UE information identification procedure 830 with the UE 800.

Specifically, the eNB 805 may identify information about radio frequency (RF) capability of the UE 800 by transmitting a UE capability enquiry (UECapabilityEnquiry) message to the UE 800 in operation 832 and receiving a UE capability information (UECapabilityInformation) message from the UE 800 in operation 834. The RF capability information may include, for example, information indicating how many SCells the UE 800 can use by the CA method.

If the eNB 805 determines that an additional operating frequency (i.e., an SCell) is required for the UE 800 due to an increase in the traffic for the UE 800, the eNB 805 and the UE 800 may add an SCell through an RRC reconfiguration procedure in operation 840.

The procedure 840 of RRC reconfiguration may include an operation 842 in which the eNB 805 transmits an RRC connection reconfiguration (RRCConnectionReconfiguration) message including an identifier of the SCell to be added, to the UE 800, and an operation 844 in which the eNB 805 receives an RRC connection reconfiguration complete (RRCConnectionReconfigurationComplete) message from the UE 800. Through the procedure 840 of RRC reconfiguration, the UE 800 may add the SCell as a new operating frequency in operation 846. An initial state when the SCell is added may be a deactivation state.

In order to use the SCell that is added through the procedure 840 of RRC reconfiguration, the eNB 805 may activate the added SCell by transmitting a MAC control element indicating SCell activation to the UE 800 in operation 850. Upon receiving the MAC control element, the UE 800 may use the activated SCell in operation 852.

The SCell addition process applied to the LTE system may be performed if the eNB determines that an additional operating frequency is required due to an increase in the traffic for a specific UE. In the current LTE system operating in a licensed band, a UE may use a new SCell as intended by the eNB at all times.

However, in the LTE-U system operating in an unlicensed band, even though an eNB adds an SCell to a UE and activates the SCell, in a case where in the added SCell, the eNB has detected a busy state or the UE has detected a busy state, the transmission through the SCell may be impossible or the reception quality may be significantly degraded.

Therefore, when adding an SCell to a UE, if an eNB selects a channel to be added, considering the degree at which Wi-Fi is activated in the channel, or the degree/time at which the eNB and the UE detect a busy state, it is possible to improve the communication success probability and reception quality of the LTE-U system using an unlicensed band.

Figure 9A:
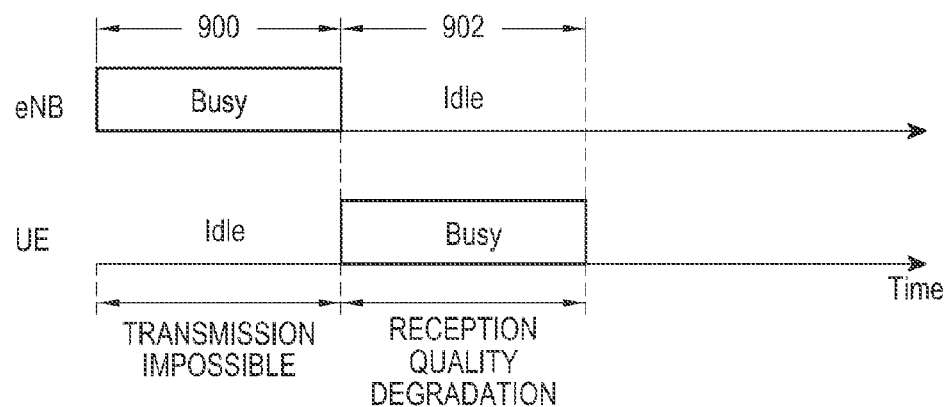
FIGS. 9A and 9B illustrate channel sensing results for each interval and transmission possibilities of an evolved Node B (eNB) and a user equipment (UE) of an LTE system according to an embodiment of the present disclosure.
Figure 9B:
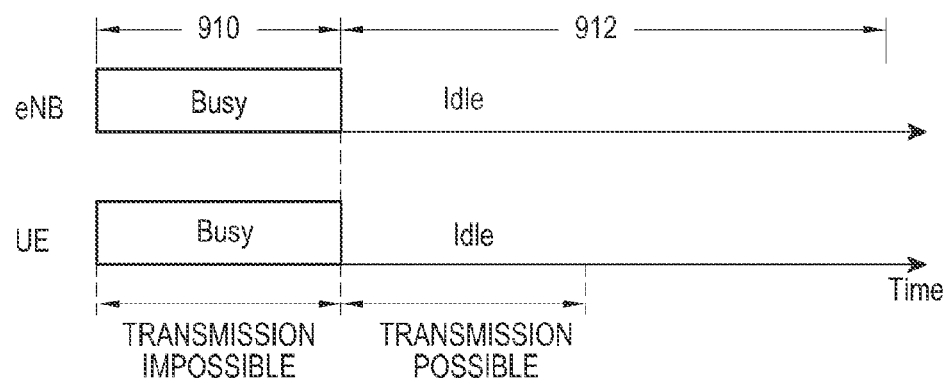

FIGS. 9A and 9B illustrate channel sensing results for each interval and transmission possibilities of an eNB and a UE of an LTE system according to an embodiment of the present disclosure.

Referring to FIG. 9A, in a first interval indicated by an identification number 900 among two intervals in FIG. 9A, an eNB may sense the channel state as a busy state and a UE may sense the channel state as an idle state. In a second interval indicated by an identification number 902, the eNB may sense the channel state an idle state and the UE may sense the channel state as a busy state. The eNB will not perform transmission in the first interval 900 in which the eNB has sensed the channel state as a busy state, and in the second interval 902 in which the eNB has sensed the channel state as an idle state, even though the eNB performs transmission, the UE may suffer degradation of the reception quality (due to the interference).

Referring to FIG. 9B, in a first interval indicated by an identification number 910 among two intervals in FIG. 9B, both of an eNB and a UE may sense the channel state as a busy state. In a second interval indicated by an identification number 912, both of the eNB and the UE may sense the channel state as an idle state. The eNB will not perform transmission in the first interval 910 in which the eNB has sensed the channel state as a busy state, and in the second interval 912 in which the eNB has sensed the channel state as an idle state, the eNB will transmit data and the UE may successfully receive the data.

In other words, referring to FIGS. 9A and 9B, it can be noted that even though the length of the time, in which the eNB or the UE has sensed the channel state as a busy state, is the same, the transmittable period is different depending on when the eNB or the UE has sensed the channel state as a busy state.

Downlink transmission is impossible if only the eNB has detected the channel state as a busy state, and the reception quality may be significantly degraded if only the UE has detected the channel state as a busy state. Further, the downlink transmission is impossible even if both of the eNB and the UE have detected a busy channel. After all, the time in which the downlink transmission/reception can be made without degradation of the reception performance may be the time in which both of the eNB and the UE have detected an idle channel.

Therefore, even when adding an SCell to the UE, if the eNB selects a channel to be added, considering the channel sensing results of the eNB and the UE, it is possible to increase the utilization of channel resources.

As described above, the reason why the eNB and the UE detect different channel states (busy or idle) is because a Wi-Fi AP or a Wi-Fi station (Wi-Fi STA) sharing a channel of an unlicensed band is irregularly distributed in the neighborhood, causing the hidden node issue. Therefore, in order to identify the channel, the state of which both of the eNB and the UE detect an idle state, the eNB or the UE should deliver the information about the channel state sensed by the eNB or the UE, to its opponent (e.g., the UE or the eNB).

As used herein, the channel state information may refer to information indicating whether a magnitude or a received signal strength indicator (RSSI) value of an interference signal, which is measured by an eNB or a UE operating in a specific channel, is greater than or equal to, or less than a threshold. If the strength or RSSI value of the interference signal is greater than or equal to the threshold, it means that the channel occupancy state is a busy state, and if the strength or RSSI value of the interference signal is less than the threshold, it means that the channel occupancy state is an idle (or clear) state. Therefore, in an embodiment of the present disclosure, the 'channel state information' may be referred to as 'channel occupancy state information'.

An eNB or a UE may spontaneously measure a magnitude or an RSSI value of an interference signal to determine whether the current channel occupancy state is a busy state or an idle state. The eNB or the UE may transmit the determination result (i.e., the busy state or the idle state) to its opponent (the UE or the eNB). Alternatively, the eNB or the UE may measure a magnitude or an RSSI value of an interference signal, and transmit the determination result (i.e., the magnitude or RSSI value of the interference signal) to its opponent (the UE or the eNB). Upon receiving the determination result, the UE or the eNB may compare the received measurement result with a threshold to determine the current channel occupancy state.

The first method of the present disclosure may have a plurality of embodiments for identifying the channel, the state of which is sensed as an idle state by both of the eNB or the UE.

A first embodiment of the first method is a method in which the UE and the eNB select a channel by performing sensing in common (or at the same time) for a specific operating frequency during a predetermined sensing period (or a certain detection period), and a second embodiment of the first method is a method in which the UE (or the eNB) performs channel sensing for at least one operating frequency using the idle/busy state-related information provided by the eNB (or the UE), and feeds back the results to its opponent, thereby selecting a channel.

Figure 10:
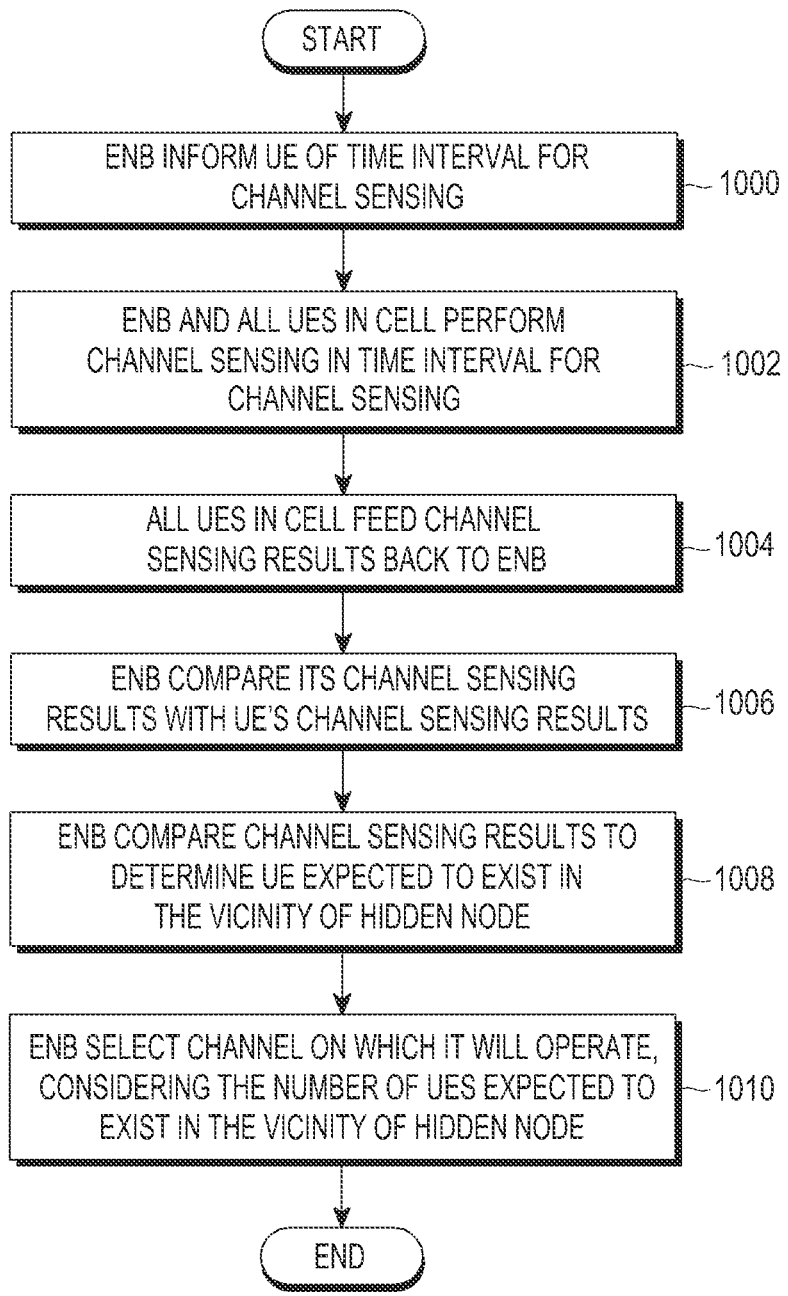
FIG. 10 illustrates a method of selecting an operating frequency considering a hidden node by an eNB and a UE of an LTE-U system according to a first embodiment of a first method of the present disclosure.

FIG. 10 illustrates a method of selecting an operating frequency considering a hidden node by an eNB and a UE of an LTE-U system according to a first embodiment of a first method of the present disclosure.

Referring to FIG. 10, the eNB or the UE of the LTE-U system may perform at least one of the following operations.

The eNB may determine a time interval for channel sensing, and inform the UE of the information about the time interval for channel sensing and a target channel (i.e., an SCell) using a sensing indicator, in operation 1000. Further, the eNB may also determine the frequency position (e.g., a time-frequency resource block index) for channel sensing, and may further provide information about the determined frequency position using the sensing indicator.

Table 2 shows an example of the contents of information elements included in a sensing indicator (or a detection indicator) that an eNB transmits to a UE in the first embodiment of the first method of the present disclosure.

TABLE 2

| Information element | Value | Remarks |
| --- | --- | --- |
| Sensing initiation time | M-th symbol in N-th subframe, or M-th subfraem in N-th frame | |
| Sensing period | P subframes | Period in which UE performs channel sensing in every P subframes |
| Averaging period | A subframes or K measured RSSI samples | Average the reporting measurements in every R subframes, and make a report without averaging if K = 1. |
| Reporting period | R subframes | Make a report in every R subframes |

TABLE 2-continued

| Information element | Value | Remarks |
| --- | --- | --- |
| Sensing duration | L symbols, or L subframes | |
| Sensing subcarrier | Subcarrier set | |
| Sensing resource block | Specific subcarrier position or specific time-frequency resource block index, or all subcarriers (full bandwidth) | ID or index specifying the position of a time-frequency resource block |
| Busy/idle criterion | X dBm (threshold) | Not required if it is defined as a system parameter. Required if it is a value that can be set by each eNB. |
| Sensing channel ID | SCell ID operating in the unlicensed band | Frequency channel (e.g., index or corresponding center frequency for a frequency channel in units of 10M) that UE should sense |

Depending on the implementation, some or all of the information illustrated in Table 2 may be optionally included in the sensing indicator. In the first embodiment of the first method of the present disclosure, the sensing indicator that an eNB transmits to a UE may include sensing initiation time information and sensing duration information. The sensing indicator may further include at least one of busy/idle criterion information and sensing channel ID information. Since all UEs should perform channel sensing during the sensing duration indicated by the sensing indicator, the sensing indicator may not necessarily include information for identifying UEs.

Optionally, the sensing indicator may include at least one of a sensing channel ID (a channel identifier (e.g., an index or corresponding center frequency for a frequency in units of 10M) for performing sensing), a sensing subcarrier, a sensing resource block (information about the position of a time-frequency resource block) and a sensing period, an averaging period (a period in which an average value of the sensing result is derived) and a reporting period (information about the period in which the sensing result is reported to the eNB). For example, if channel sensing is performed on the full bandwidth of a specific channel, the sensing subcarrier information may not be included. Further, if the sensing resource block information is included, the sensing subcarrier information which is information for specifying a sensing target, and the sensing duration information may not be included. Further, if the sensing resource block information is included, since the subframe, in which sensing is initiated, may be indicated by the sensing resource block information, the sensing initiation time information may not be included.

Figure 29:
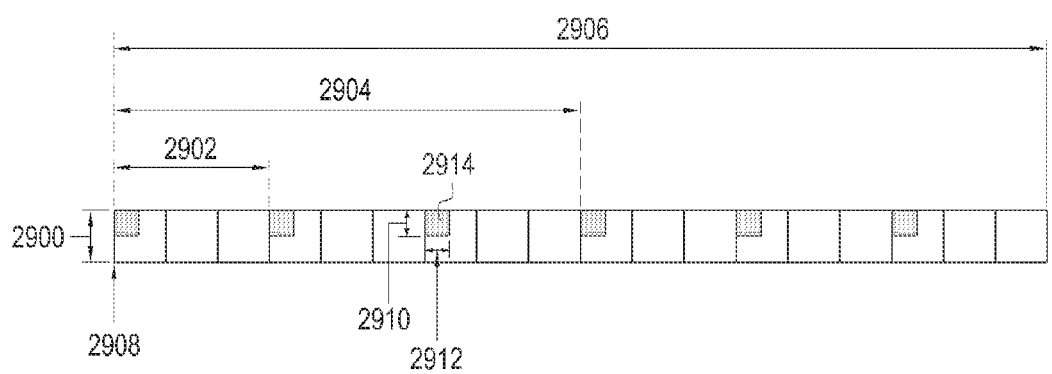
FIG. 29 illustrates the meaning indicated by the information of the sensing indicator illustrated in Table 2 in an actual subframe structure Throughout the drawings, like reference numerals will be understood to refer to like parts, components, and structures.

FIG. 29 illustrates the meaning indicated by the information of the sensing indicator illustrated in Table 2 in an actual subframe structure.

Referring to FIG. 29, a sensing channel ID 2900 indicates information for identifying a frequency channel that is subject to channel sensing. A sensing duration 2902 is a period in which channel sensing is performed once. It will be assumed herein that channel sensing is performed once in every 3 subframes. An averaging period 2904 refers to a period in which channel sensing by a UE is reported. It will be assumed herein that averaging of measurements is performed in every 9 subframes (i.e., 3 times of channel sensing). A reporting period 2906 is a period in which the channel sensing result of a UE (or an eNB) is reported. It will be assumed herein that reporting is performed in every 18 subframes (i.e., 6 times of channel sensing and 2 times of measurement averaging).

A sensing initiation time 2908 indicates a time at which sensing is initiated, a sensing subcarrier 2910 indicates a subcarrier that is subject to channel sensing, and a sensing duration 2912 indicates a symbol that is subject to channel sensing. The sensing initiation time 2908, the sensing subcarrier 2910 and the sensing duration 2912 may be replaced by the information indicating a sensing resource block 2914. Since the sensing indicator in the first embodiment of the first method indicates sensing for any one channel, the eNB should transmit again the sensing indicator each time the eNB indicates sensing of another channel. In other words, since the sensing indicator in the first embodiment of the first method is information that is transmitted in a very short cycle and broadcasted to all UEs, the sensing indicator may be transmitted over, for example, a physical downlink shared channel (PDSCH). However, the present disclosure is not limited thereto, the sensing indicator may be transmitted over a physical downlink control channel (PDCCH), and may be transmitted using a measurement-related radio resource control (RRC) message (e.g., an RRCconnectionReconfiguration message or an RRCConnectionConfiguration message). The 'sensing initiation time (or a detection initiation time)' information and the 'sensing duration' information included in the sensing indicator are information that indicates the interval, in which the eNB and all UEs in the cell perform channel sensing without performing data transmission/reception, in initiation time and length, respectively. The length of the sensing duration may be indicated in units of, for example, symbols, but may also be indicated in units of frames or subframes.

In the sensing duration indicated by the sensing indicator, the eNB and all UEs in the cell may perform channel sensing in operation 1002.

All the UEs in the cell may feed the channel sensing results (i.e., the channel occupancy state information or the measured magnitude or RSSI value of an interference signal) back to the eNB in operation 1004.

The eNB may compare its channel sensing results with the channel sensing results of the UEs in operation 1006.

The eNB may determine a UE that is expected to exist in the vicinity of a hidden node by comparing the channel sensing results, in operation 1008. Specifically, when the eNB has sensed the channel state as an idle state, the eNB may determine a UE that has sensed the channel state as a busy state, as a UE that exists in the vicinity of a hidden node.

The eNB may select a transmission channel considering the number of UEs that are expected to exist in the vicinity of a hidden node, in operation 1010. For example, the eNB may select the channel as a channel to be used for transmission, if the number of UEs that are expected to exist in the vicinity of a hidden node is less than or equal to a certain threshold.

The operation 1008 of determining a UE that is expected to exist in the vicinity of a hidden node will be described with reference to Table 3. The channel sensing results of the eNB and the UE in operation 1006 may be summarized in combination as shown in, for example, Table 3.

TABLE 3

| Case | Channel sensing result of eNB | Feedback channel sensing result of UE | Remarks |
|---|---|---|---|
| 1 | Idle | Idle | |
| 2 | Idle | Busy | Hidden node issue occurs |
| 3 | Busy | Idle | |
| 4 | Busy | Busy | |

If the sensing result of the eNB is the same as the sensing result of the UE (i.e., if an (eNB/UE) are in (idle/idle) or (busy/busy) state), the UE may operate as the eNB desires to do. Specifically, if the channel sensing results of both the eNB and the UE are idle, the eNB will determine that transmission through the unlicensed frequency band is possible. When the eNB transmits a downlink signal through the unlicensed frequency band, the UE in the idle state may also smoothly receive the downlink signal. If the channel sensing results of both the eNB and the UE are busy, the eNB will determine that transmission through the unlicensed frequency band is impossible, and may not perform transmission. Further, in the case where the channel sensing results of both the eNB and the UE are busy, even though the eNB performs downlink data transmission, the UE in the busy state may not smoothly receive the downlink data. Therefore, in this case, the eNB does not perform transmission.

Figure 4:
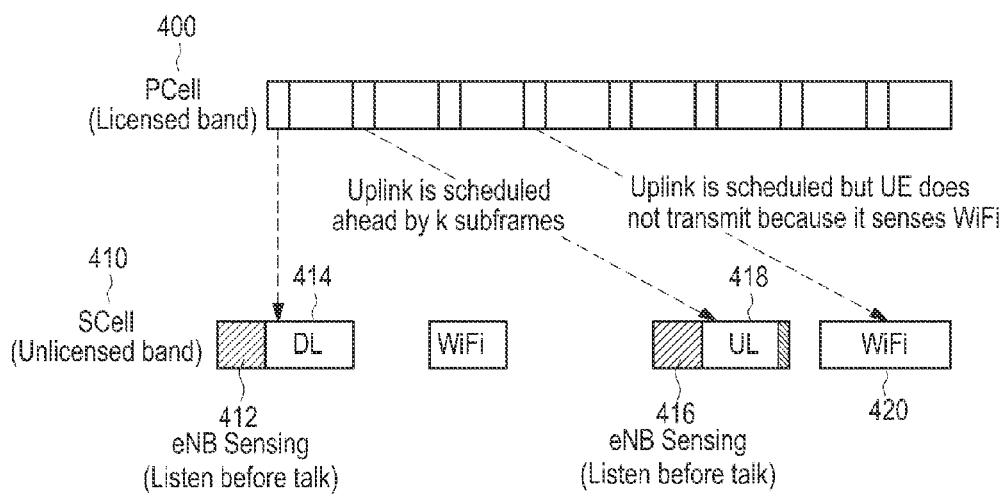
FIG. 4 illustrates a transmission frame structure for a description of a transmission operation by channel sensing in an LTE-unlicensed (LTE-U) system implementing carrier aggregation (CA) using an unlicensed frequency band according to the related art.

If the channel sensing result of the eNB is different from the channel sensing result of the UE, the UE may not operate as the eNB desires to do. Specifically, in a case where the channel sensing result of the eNB is busy and the channel sensing result of the UE is idle, although the sensing results of the nodes are different from each other, the hidden node issue may not occur. This is because in this case, the eNB will not perform downlink transmission since the eNB has detected the state of the channel as a busy state, and will not give any damage or interference to other wireless communication devices (e.g., a Wi-Fi device) that use the same channel. However, if the channel sensing result of the eNB is idle and the channel sensing result of the UE is busy, the hidden node issue may occur. Assuming that the basic transmission/reception operation of the LTE-U system, which is illustrated in FIG. 4, is performed, the eNB will start downlink data transmission in the channel since the eNB has detected the idle state. However, the UE is highly likely to fail to successfully receive the signal transmitted in the channel since the UE has detected the busy state. This is because the node (i.e., a hidden node) that the eNB has failed to detect may give interference to the UE since the node is performing transmission over the channel in the vicinity of the UE. Besides, if the hidden node is an RX and exists in coverage of the LTE-U eNB, the hidden node may also be subject to interference from the eNB.

In other words, if the channel sensing result of the eNB is idle and the channel sensing result of the UE is busy, successful reception of the LTE-U UE is difficult, and in some cases, the hidden node may also be subject to damage or interference from the LTE-U eNB. As a result, this case needs to be fully suppressed.

In this way, by identifying a case where the channel sensing result of the eNB is idle and the channel sensing result of the UE is busy, based on the comparison in operation 1006, the eNB may determine a UE near the hidden node in operation 1008. Further, the eNB may determine the number of times that the channel sensing results of (eNB/UE) are observed as (idle/busy) for a specific channel, in every channel sensing time interval, and may perform selection of a transmission channel based on the number of times. Specifically, the eNB may determine, as an operating frequency, the channel with the smallest number of times or the channel, the number of times of which is less than or equal to a threshold. As used herein, the number of times that the channel sensing results of (eNB/UE) are observed as (idle/busy) may refer to the number of UEs that have sensed the channel state as a busy state when the eNB has sensed the channel state an idle state.

Figure 11:
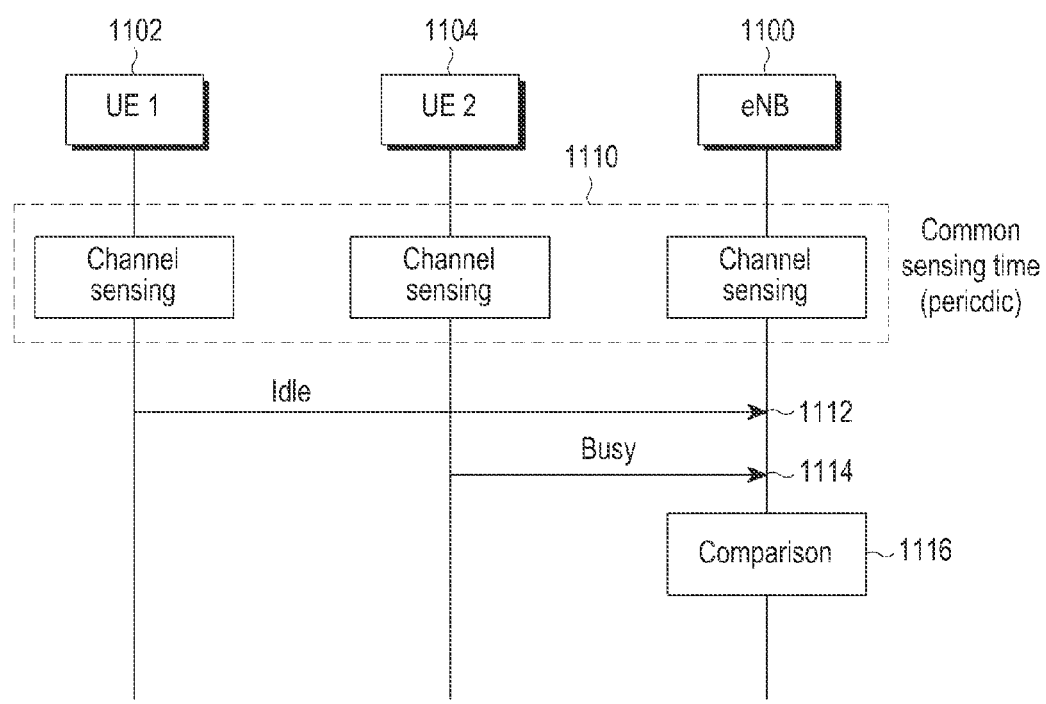
FIG. 11 illustrates a process of detecting a hidden node using a channel sensing time interval by an eNB of an LTE-U system according to the first embodiment of the first method of the present disclosure.

FIG. 11 illustrates a process of detecting a hidden node using a channel sensing time interval by an eNB of an LTE-U system according to the first embodiment of the first method of the present disclosure.

Referring to FIG. 11, an eNB 1100 may inform a sensing initiation time and a sensing duration by transmitting a sensing indicator to a UE1 1102 and a UE2 1104 in the cell.

During the sensing duration indicated by the sensing indicator, the eNB 1100 and both of the UE 1 1102 and the UE2 1104 may perform channel sensing for a specific channel (i.e., an SCell) indicated by the sensing indicator in common, without performing data transmission, in operation 1110.

Each of the UE1 1102 and the UE2 1104 may feed back its channel sensing result (i.e., the channel occupancy state information or the measured magnitude or RSSI value of an interference signal) to the eNB 1100. For example, the UE1 1102 may report the channel sensing result of the specific channel as 'idle' in operation 1112, and the UE2 1104 may report the channel sensing result of the specific channel as 'busy' in operation 1114. As another example, a UE may feed back its measured magnitude or RSSI value of an interference signal to an eNB. Based on the magnitude or RSSI value of an interference signal, which is fed back by the UE, the eNB may determine the channel occupancy state (i.e., a busy state or an idle state) that the UE is presently experiencing.

The eNB 1100 may compare the channel sensing results reported from the UE1 1102 and the UE2 1104 with its channel sensing result (of the eNB 1100) in operation 1116.

For example, if the eNB 1100 has sensed the channel state as an idle state, the eNB 1100 may determine that the UE2 1104 that has fed back the channel sensing result of the channel as 'busy' has the hidden node issue.

Optionally, an embodiment of the present disclosure may be implemented to have the channel sensing time interval (i.e., a time interval in which the eNB and both of the UEs perform channel sensing at the same time) two or more times periodically or aperiodically. In order to prevent (or alleviate) the phenomenon that an eNB iteratively transmit the sensing indicator to a UE, the UE may periodically perform channel sensing if the eNB transmits the sensing indicator to the UE once. Information elements of a sensing indicator indicating iterative sensing are illustrated in Table 4.

TABLE 4

| Information element | Value | Remarks |
| --- | --- | --- |
| Sensing initiation time | M-th symbol in N-th subframe, or M-th subfraem in N-th frame | |
| Sensing duration | L symbols or L subframes | |
| Busy/idle criterion | X dBm (threshold) | Not required if it is defined as a system parameter. Required if it is a value that can be set by each eNB. |
| Sensing channel ID | SCell ID operating in the unlicensed band | Frequency channel (e.g., index or corresponding center frequency for a frequency channel in units of 10M) that UE should sense |
| UE ID | Destination UE ID whose data is arrived at eNB | Not required if sensing indicator is transmitted to specific UE through dedicated signaling. Not required when sensing is indicated for all UEs. |
| Sensing period | P subframes (sensing is performed in every P subframes) | Period in which UE performs channel sensing in every P subframes |
| Total number of sensing operations | Y times (sensing is performed Y times in total) | It can be expressed as sensing end time. |
| Averaging period | A subframes or K measured RSSI samples | Average the reporting measurements in every R subframes, and make a report without averaging if K = 1. |
| Reporting period | R subframes | Make a report in every R subframes |
| Sensing resource block | Specific subcarrier position or specific time-frequency resource block index, or all subcarriers (full bandwidth) | |
| Sensing subcarrier | Subcarrier set | |
| Sensing resource block | Specific subcarrier position or specific time-frequency resource block index, or all subcarriers (full bandwidth) | ID or index specifying the position of a time-frequency resource block |

Depending on the implementation, some or all of the information illustrated in Table 4 may be optionally included in the sensing indicator. According to Table 4, for example, the eNB performs sensing during L symbols starting from an M-th symbol in an N-th subframe, and the eNB may iterate the sensing a total of Y times by performing the sensing in every length-P subframes.

If a UE periodically performs sensing by the sensing indicator, the UE may report the sensing result (i.e., busy/idle) to the eNB every time the UE performs sensing (i.e., in every P subframes) or in every specified reporting period, or may report the sensing result to the eNB only when the sensing result is changed. For example, the UE may report the sensing result to the eNB only if the sensing result is changed from busy to idle, or from idle to busy, without reporting the sensing result to the eNB every time the eNB performs sensing.

Upon receiving the sensing result of the UE, the eNB may derive an average value of the number of times that the channel sensing results of (eNB/UE) are observed as (idle/busy), and use the average value for selection of a transmission channel. In this case, the eNB may first select the channel with the smallest average value as a transmission channel. Further, upon receiving the magnitude or RSSI value of an interference signal from each UE, the eNB may derive the average magnitude or RSSI value of an interference signal, which is measured by the UE in every reporting period, and use the average value in channel selection. The eNB may first select a channel with the smallest average as a transmission channel. Various modifications can be applied to the detailed method of selecting a transmission channel by an eNB. As an example, the eNB may select a channel by considering both of the channel occupancy ratio determined for each channel and the number of UEs affected by the hidden node. An eNB's method of selecting an operating frequency considering both of the channel occupancy ratio and the number of UEs affected by the hidden node will be described with reference to FIG. 12.

Figure 12:
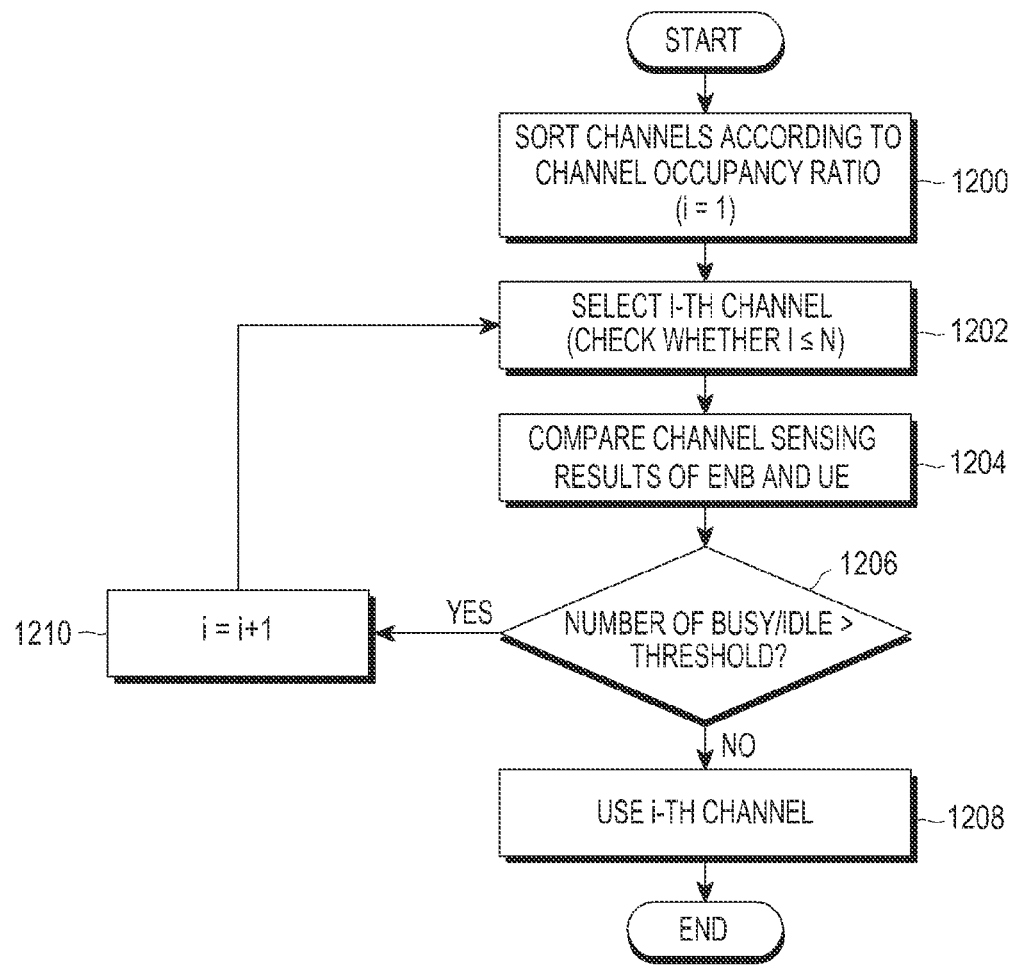
FIG. 12 illustrates a method of selecting a transmission channel by an eNB considering a channel occupancy ratio and a number of UEs affected by a hidden node according to the first embodiment of the first method of the present disclosure.

FIG. 12 illustrates a method of selecting a transmission channel by an eNB considering a channel occupancy ratio and a number of UEs affected by a hidden node according to the first embodiment of the first method of the present disclosure.

Referring to FIG. 12, an eNB may sort a plurality of selectable channels in ascending order of channel occupancy ratio in operation 1200. The number of selectable channels is assumed to be N. In this case, a channel index i can be set to 1.

The eNB may generate a sensing indicator indicating sensing for an i-th channel (i.e., an SCell), and transmit the generated sensing indicator to UEs. The eNB and the UE select an i-th channel, access the selected channel, and perform channel sensing in operation 1202. Since the channels are sorted in ascending order of channel occupancy ratio in operation 1200, the channel (a channel with i=1) that is first accessed for channel sensing is a channel with the lowest channel occupancy ratio. In this case, an operation of checking (or determining) whether i is greater than N may be further performed (for termination of the sensing operation), and as a result, channel sensing will be performed only if i is less than or equal to N. Further, the eNB may receive the channel sensing result fed back from the UE.

The eNB may compare its channel sensing result with the channel sensing result fed back from the UE in operation 1204.

After identifying the number of times that the channel sensing results of (eNB/UE) are observed as (idle/busy) (i.e., the number of UEs existing in the vicinity of a hidden node) as a result of the comparison in operation 1204, the eNB may determine in operation 1206 whether the number of times is less than or equal to a threshold.

If it is determined in operation 1206 that the number of times is less than or equal to the threshold, the eNB may determine the channel (an i-th channel) as a channel to be used, in operation 1208.

If it is determined in operation 1206 that the number of times is greater than the threshold, the eNB may increase i by one (1) in operation 1210, select another channel (a channel with a higher channel occupancy ratio) in operation 1202, compare the eNB's channel sensing result with the feedback channel sensing result in operation 1204, and perform the determination operation in operation 1206.

Through this procedure, the LTE-U eNB may select a channel in which the LTE-U eNB will operate.

Alternatively, the LTE-U eNB may select a transmission channel by changing in various ways the combination of the channel occupancy ratio and the number of times that the channel sensing results of (eNB/UE) are observed as (idle/busy).

Figure 13A:
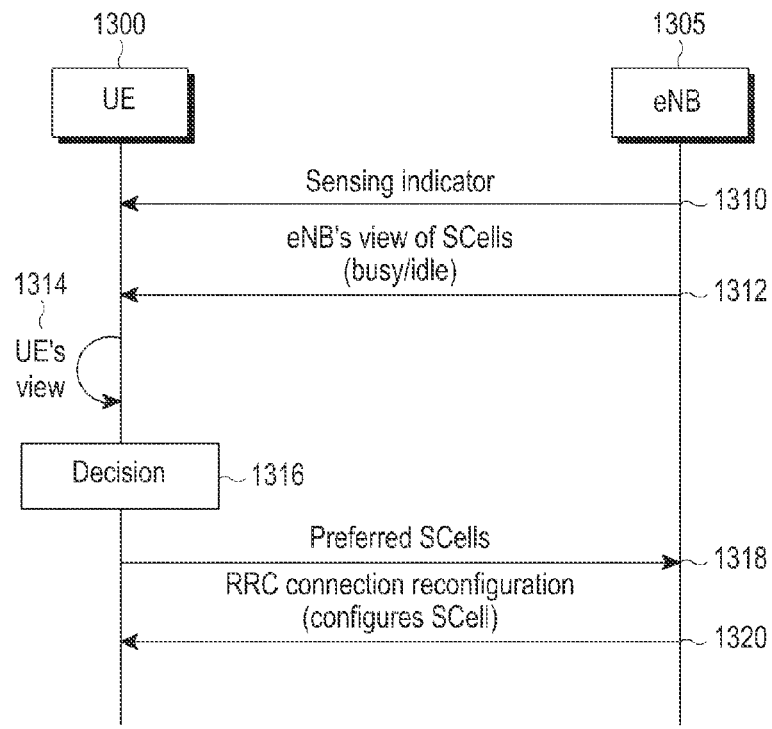
FIGS. 13A and 13B illustrate a method of exchanging channel state information by an eNB and a UE according to a second embodiment of the first method of the present disclosure.
Figure 13B:
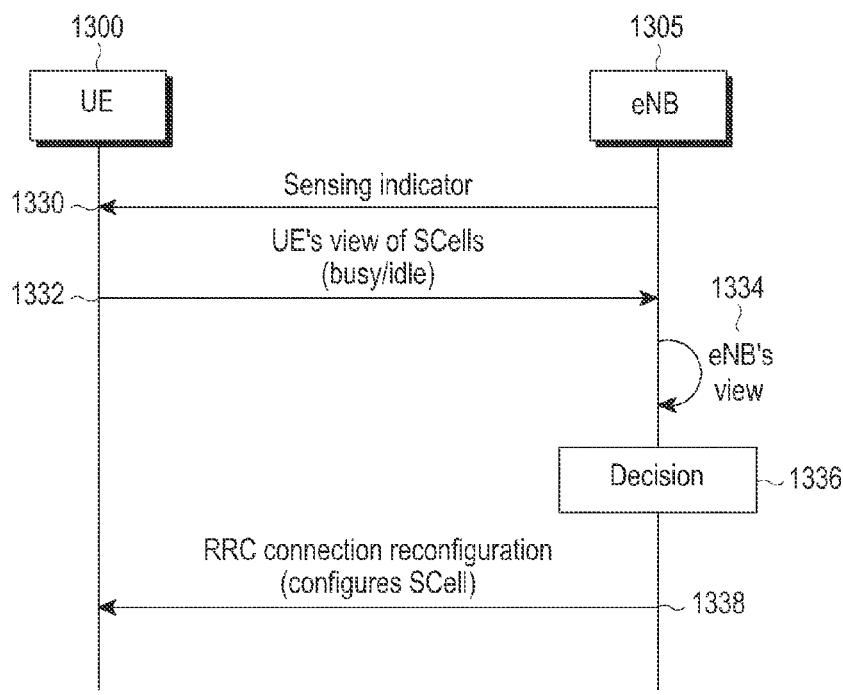

FIGS. 13A and 13B illustrate a method of exchanging channel state information by an eNB and a UE according to a second embodiment of the first method of the present disclosure.

Referring to FIGS. 13A and 13B, the second embodiment of the first method of the present disclosure is a method in which the eNB or the UE determines a channel in which the channel sensing results of (eNB/UE) are observed as (idle/busy), using the channel state information received from its opponent, rather than the eNB and the UE sense a specific channel at the same time. In other words, in the second embodiment of the first method, if any one of the eNB and the UE first detects states of the channels and deliver the channel state information to its opponent (i.e., the UE or the eNB), the opponent may determine a channel in which the channel sensing results of (eNB/UE) are observed as (idle/busy), using the channel state information.

In the second embodiment of the first method, the eNB may inform at least one channel (i.e., an SCell) which is a sensing target, by transmitting a sensing indicator including information elements as shown in Table 5, to the UE in operations 1310 and 1330.

TABLE 5

| Item | Value | Remarks |
| --- | --- | --- |
| Sensing initiation time | M-th symbol in N-th subframe, or M-th subfraem in N-th frame | UE may or may not perform sensing at the time indicated by eNB. |
| Sensing duration | L symbols or L subframes | |
| Busy/idle criterion | X dBm (threshold) | Not required if it is defined as a system parameter. Required if it is a value that can be set by each eNB. |
| Sensing channel ID | SCell ID operating in the unlicensed band | It can indicate a plurality of operating frequency channels |
| Sensing period | P subframes | Period in which UE performs channel sensing in every P subframes |
| Averaging period | A subframes or K measured RSSI samples | Average the reporting measurements in every R subframes, and make a report without averaging if K = 1. |
| Reporting period | R subframes | Make a report in every R subframes |
| Sensing subcarrier | Subcarrier set | |
| Sensing resource block | Specific subcarrier position or specific time-frequency resource block index, or all subcarriers (full bandwidth) | ID or index specifying the position of a time-frequency resource block |

Depending on the implementation, some or all of the information illustrated in Table 5 may be optionally included in the sensing indicator. In the second embodiment of the first method of the present disclosure, the sensing indicator that the eNB transmits to the UE may include sensing initiation time information and sensing duration information. The sensing indicator may further include at least one of busy/idle criterion information and sensing channel ID information. Since the sensing indicator is transmitted to a specific UE by dedicated signaling, the sensing indicator should not necessarily include information for identifying UEs.

Since the sensing indicator in the second embodiment of the first method can indicate sensing for a plurality of channels, the sensing indicator doesn't have to be frequently transmitted like the sensing indicator in the first embodiment of the first method, and since the sensing indicator is transmitted to a specific UE by dedicated signaling, the sensing indicator may be transmitted through, for example, an RRC layer message.

The 'sensing initiation time' information and the 'sensing duration' information included in the sensing indicator are information that indicates the interval, in which the UE receiving the sensing indicator performs channel sensing, in initiation time and length, respectively. However, in the second embodiment of the first method, since the eNB and the UE don't have to perform channel sensing at the same time, the UE may initiate channel sensing at a time within a certain error range, without performing channel sensing at the time indicated by the sensing initiation time information. The length of the sensing duration may be indicated in units of, for example, symbols, but may also be indicated in units of frames or subframes.

FIG. 13A illustrates a method in which after an eNB delivers channel state information detected by the eNB to a UE, the UE compares its channel sensing result with the channel state information received from the eNB to identify an interval in which the channel sensing results of both the eNB and the UE are idle.

An eNB 1305 may transmit a sensing indicator indicating at least one channel (i.e., an SCell) to be sensed, to a UE 1300 in operation 1310.

The eNB 1305 may transmit signaling indicating sensing results of channels to the UE 1300 in operation 1312.

The UE 1300 may perform sensing for a channel in which the sensing result is indicated by the signaling (1312), in operation 1314.

The UE 1300 may determine a channel in which the channel sensing results of (eNB/UE) are observed as (idle/idle), by comparing its channel sensing result with the channel sensing results received from the eNB 1305 in operation 1316.

Based on the decision in operation 1316, the UE 1300 may transmit information about the UE 1300's preferred channels (SCell) to the eNB 1305 in operation 1318.

The eNB 1305 may determine an SCell to be added, using the preferred channel information received from the UE 1300, and add the SCell by transmitting an RRCConnectionReconfiguration message to the UE 1300, in operation 1320.

FIG. 13B illustrates a method in which after a UE delivers channel state information detected by the UE to an eNB, the eNB compares its channel sensing result with the channel state information received from the UE to identify an interval in which the channel sensing results of both the eNB and the UE are idle.

The eNB 1305 may transmit a sensing indicator indicating at least one channel (i.e., an SCell) to be sensed, to the UE 1300 in operation 1330.

The UE 1300 may transmit, to the eNB 1305, signaling indicating sensing results of channels indicated by the sensing indicator (1330) in operation 1332.

The eNB 1305 may perform sensing for a channel in which the sensing result is indicated in the signaling (1332) in operation 1334.

The eNB 1305 may determine a channel in which the channel sensing results of (eNB/UE) are observed as (idle/idle), by comparing its channel sensing result with the channel sensing results received from the UE 1300 in operation 1336.

Based on the decision in operation 1336, the eNB 1305 may determine an SCell to be added, and add the SCell by transmitting an RRCConnectionReconfiguration message to the UE 1300 in operation 1338.

It must be considered that many channels exist in an unlicensed band of 5 GHz that is desired to be utilized in LTE-U. The eNB is less than the UE in overhead for channel scanning in terms of power consumption. Further, the eNB has a much higher RF capability than the UE. In addition, since the eNB services multiple UEs in multiple channels at the same time, the eNB does not require a procedure for turning on/off a separate RF module for channel scanning. However, since the UE keeps activating only the RF module for the channel that the UE is using, the UE requires a procedure for turning on/off the RF module in order to scan other channels. Considering the difference in power and performance between the UE and the eNB, the method of FIG. 13A in which the UE senses only some channels sensed by the eNB is superior to the method of FIG. 13B in which the UE senses all channels earlier than the eNB, in terms of power consumption and RF module operation.

In the method of FIG. 13A, the simplest way in which an eNB provides information about the channel state detected by the eNB to a UE is to inform the UE of 0 (idle) or 1 (busy) for all channels in every time (e.g., in every subframe). Although this method is a method in which the eNB can explicitly deliver its channel state information to the UE, the method may significantly cause the downlink signal overhand in view of the system. Further, considering the fact that many channels exist in an unlicensed band near 5 GHz, if each channel delivers channel state information of the eNB, the overhead due to the signaling may be more significant. Therefore, an improved method capable of implementing the method of FIG. 13A without the overhead will be described in FIG. 14.

Figure 14:
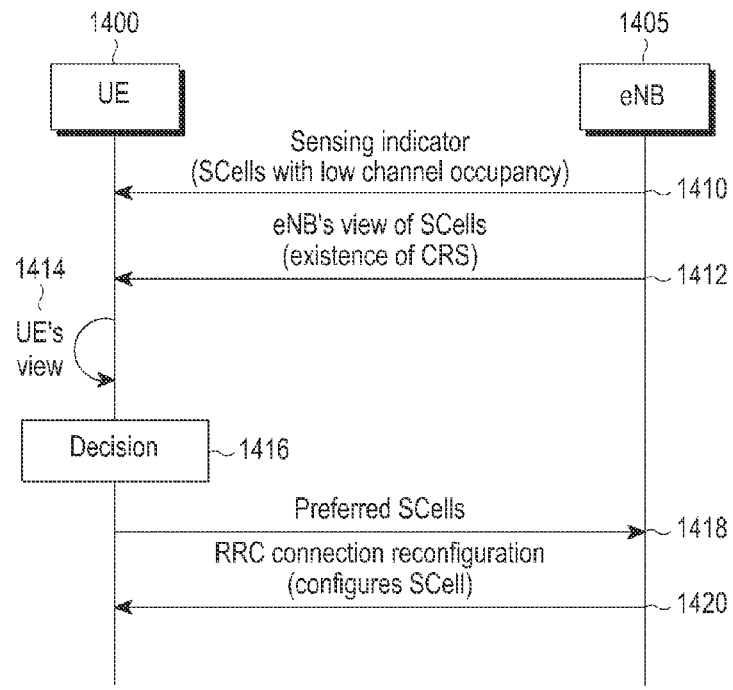
FIG. 14 illustrates a method of supporting selection of a transmission channel by a UE using a cell-specific reference signal (CRS) according to the second embodiment of the first method of the present disclosure.

FIG. 14 illustrates a method of supporting selection of a transmission channel by a UE using a cell-specific reference signal (CRS) according to the second embodiment of the first method of the present disclosure.

Referring to FIG. 14, an eNB provides a service to a plurality of UEs over a plurality of channels. If a channel on which the service is made is an idle state, the eNB may transmit a CRS over the channel. If the channel on which the service is made is a busy state, the eNB may not transmit the CRS over the channel. Therefore, even though the UE does not receive the channel state information (busy or idle) from the eNB using an explicit message, the UE may determine the state of the channel depending on whether CRS is received or not.

An eNB 1405 may select N channels that have a low channel occupancy ratio (i.e., have many intervals in which the channels are in an idle state) in view of the eNB, and transmit a sensing indicator including information about the selected channels to a UE 1400 in operation 1410.

The eNB 1405 may or may not transmit CRS on the channel depending on whether the channel (i.e., an SCell) in service is in an idle/busy state in operation 1412. In other words, if a state of an arbitrary channel is an idle state, the eNB 1405 may transmit CRS for the channel in every subframe. The UE 1400 may perform measurement for each channel that the eNB 1405 has informed through the sensing indicator (1410), for a certain time. Based on the measurement, the UE 1400 may determine whether CRS has been transmitted in every subframe of each channel.

As soon as the UE 1400 performs channel measurement for each channel that the eNB 1405 has informed through the sensing indicator (1410), the UE 1400 may identify the state (idle or busy) by sensing the channel in view of the UE 1400, in operation 1414.

Figure 15:
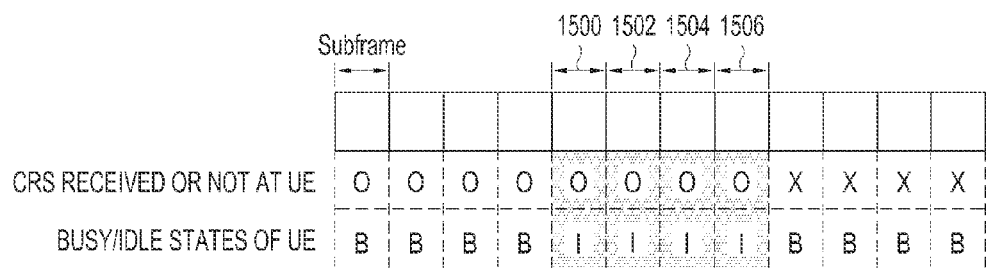
FIG. 15 illustrates a comparison between reception/non-reception of a CRS and a channel sensing result in view of a UE for a specific channel by a UE according to the second embodiment of the first method of the present disclosure.

The UE 1400 may combine information indicating whether the eNB 1405 has transmitted CRS with the channel state information that the UE 1400 has detected, in every subframe of each channel to identify the frequency (i.e., ratio) of a case where a state of the CRS is sensed as an idle state in the subframe where the CRS has been transmitted for a predetermined time as shown in FIG. 15, and may determine M channels (i.e., SCells) with the highest channel occupancy ratio as preferred channels, in operation 1416.

FIG. 15 illustrates a comparison between reception/non-reception of a CRS and a channel sensing result in view of a UE for a specific channel by a UE according to the second embodiment of the first method of the present disclosure.

Referring to FIG. 15, '0' indicates that CRS is received at the subframe, and 'X' indicates that CRS is not received at the subframe. Further, 'B' indicates that the channel sensing result in view of the UE is busy, and 'I' indicates that the channel sensing result in view of the UE is idle.

The UE may determine a channel that the UE will report to the eNB, considering the number of subframes 1500, 1502, 1504, and 1506 in which CRS is received for a specific channel and the channel state is an idle state. In other words, the UE may determine, as its preferred channel, the channel on which CRS is received and which has a high ratio of a subframe in which the channel sensing result is idle.

The UE 1400 may report to the eNB 1405, as its preferred channels, M channels on which CRS is transmitted and which have a high frequency of a subframe in which the channel state is sensed as an idle state, in operation 1418.

The eNB 1405 may select one of M channels reported from the UE 1400, and add the selected channel as SCells by transmitting an RRCConnectionReconfiguration message to the UE 1400 in operation 1420.

Through the above procedure, the eNB 1405 and the UE 1400 may add a channel having the actually longest transmittable time as an SCell, and use the SCell, and may efficiently use the frequency resources belonging to the unlicensed band in the LTE-U system.

Figure 16:
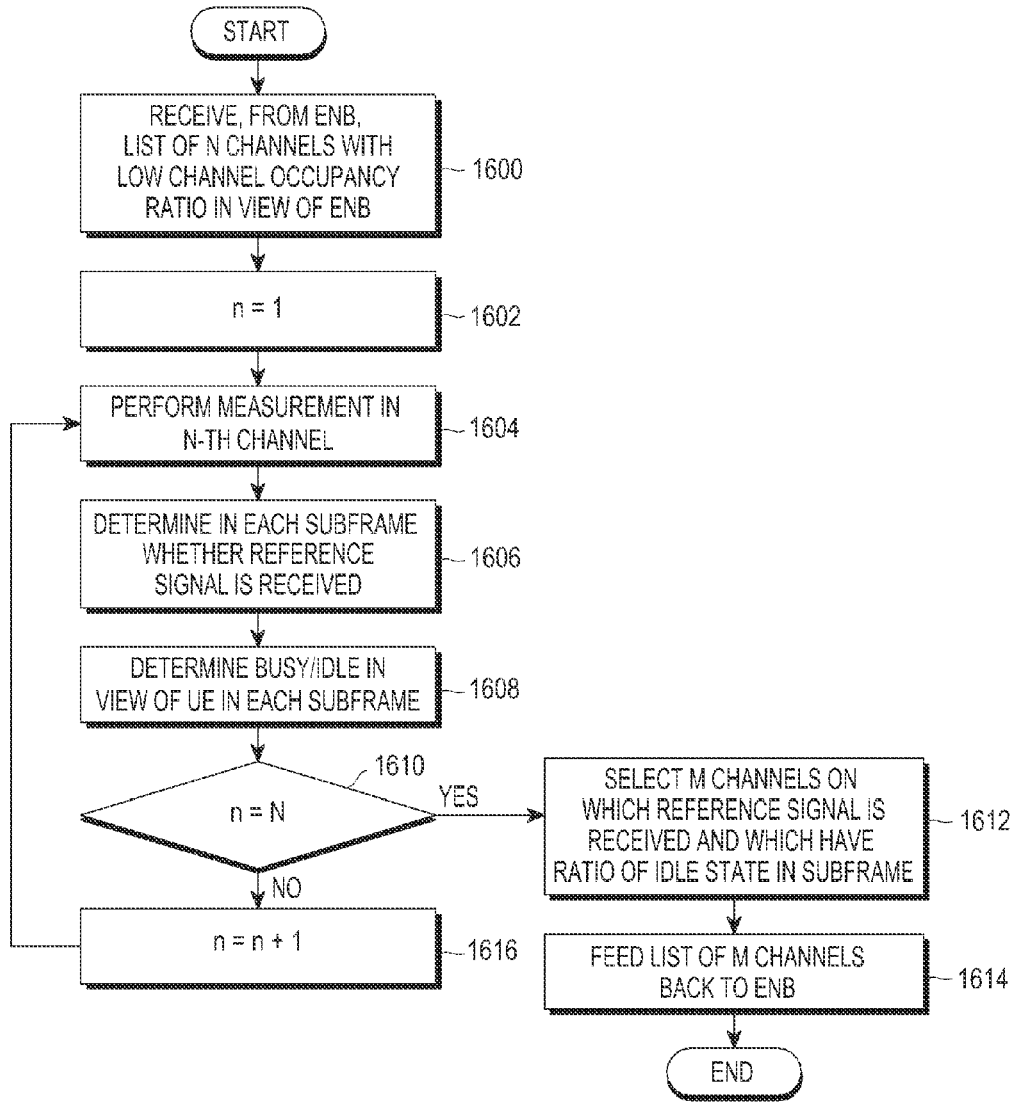
FIG. 16 illustrates an operation of determining a frequency to be added by a UE according to the second embodiment of the first method of the present disclosure.

FIG. 16 illustrates an operation of determining a frequency to be added by a UE according to the second embodiment of the first method of the present disclosure.

Referring to FIG. 16, the UE may perform at least one of the following operations.

The UE may receive a sensing indicator indicating N channels (where N≥1) from the eNB in operation 1600. The N channels indicated by the sensing indicator are channels whose channel occupancy ratio is low in view of the eNB.

The UE may set a value of an iteration index 'n' to 1 in operation 1602.

The UE may perform channel measurement in an n-th channel to determine whether CRS is received, in operation 1604.

The UE may determine in operation 1606 whether CRS is received in every subframe in an n-th channel, and may sense, in operation 1608, the channel in view of the UE in every subframe to determine whether the channel sensing result is idle/busy. Although it is shown in FIG. 16 that the operation 1606 of determining whether CRS is received or not is performed earlier than the operation 1608 of sensing the channel in view of the UE, the operations 1606 and 1608 may be performed at the same time, or may be performed in reverse order.

The UE may determine in operation 1610 whether a value of 'n' is the same as N.

If n=N, the UE may determine, as its preferred channels, M channels on which CRS is received and which have a high frequency (i.e., a ratio) of a subframe in which the channel sensing result of the UE is idle, among the N channels in operation 1612. The UE may feed information about the M preferred channels back to the eNB in operation 1614. Therefore, the eNB may determine SCell to be added, using the information about the preferred channels, which is fed back from the UE.

If n≠N, the UE may increase a value of 'n' by one (1) in operation 1616, and iterate operations 1604 to 1610.

The first method of reducing the influence by the hidden node in the channel selection process has been described so far.

In a case where there are lots of wireless communication devices (e.g., Wi-Fi devices) sharing an unlicensed band with the LTE-U system, it is impossible in reality to select a channel on which there is no hidden node. Therefore, in addition to the first method of selecting a channel on which there are few hidden nodes, there is a need for a method for more efficiently sharing a channel with a hidden node that exists unavoidably, i.e., a method for reducing the damage, if possible, that the LTE-U system and other wireless communication device inflict with each other.

To this end, the present disclosure proposes a second method in which as an LTE-U UE feeds back the channel sensing result for an added channel (i.e., an SCell) to an eNB, the eNB may control downlink transmission/reception in the channel.

Figure 17A:
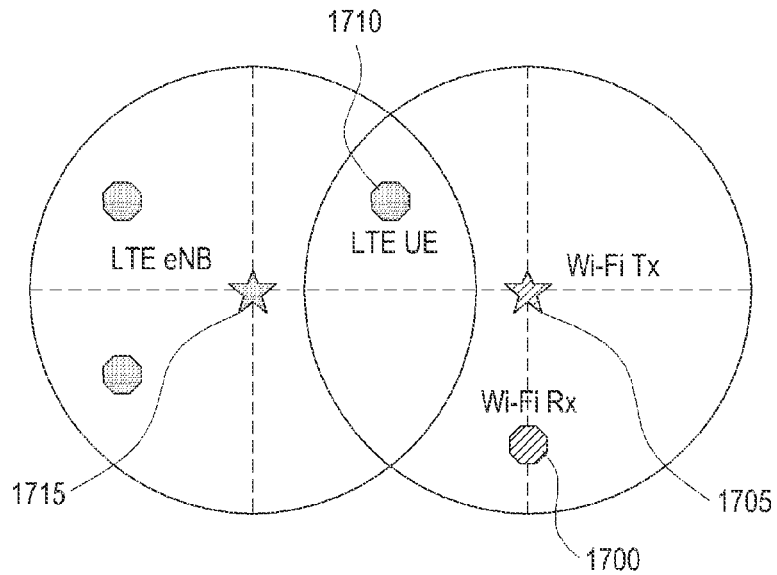
FIGS. 17A and 17B illustrate a situation in which some of a plurality of UEs scheduled by an LTE-U eNB exist in a range of a Wi-Fi TX that the eNB has failed to detect, and a downlink control operation according to a first embodiment of a second method of the present disclosure.
Figure 17B:
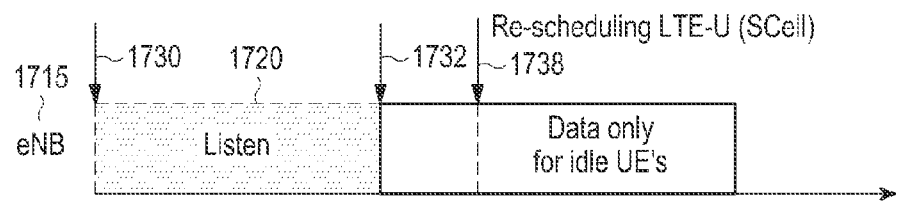
Figure 17B:
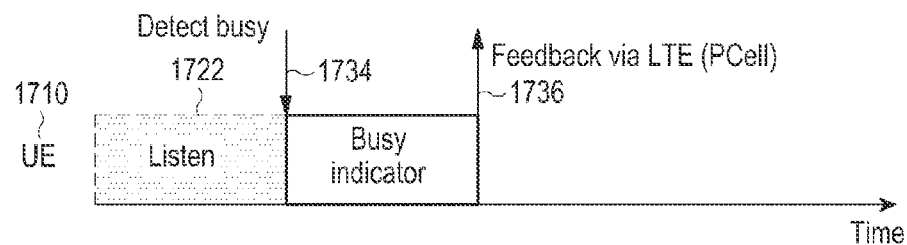
Figure 17B:
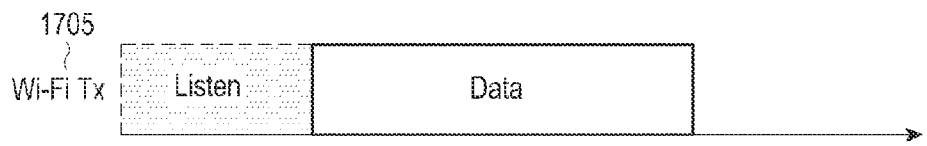

FIGS. 17A and 17B illustrate a situation in which some of a plurality of UEs scheduled by an LTE-U eNB exist in a range of a Wi-Fi TX that the eNB has failed to detect, and a downlink control operation according to a first embodiment of a second method of the present disclosure.

Referring to FIGS. 17A and 17B, a Wi-Fi RX 1700 and a Wi-Fi TX 1705 may exist out of the transmission range of an LTE-U eNB 1715. In this case, since the LTE-U eNB 1715 has failed to detect the Wi-Fi TX 1705, the LTE-U eNB 1715 will perform downlink transmission to an LTE UE 1710. However, since the LTE UE 1710 is located in the transmission range of the Wi-Fi TX 1705, the LTE UE 1710 that is subject to interference from the Wi-Fi TX 1705 is highly unlikely to successfully receive a downlink signal that the LTE-U eNB 1715 has transmitted. Eventually, it is advantageous for the LTE-U eNB 1715 in resource utilization to perform scheduling so as to perform downlink transmission to a UE that has no hidden node issue, rather than to the LTE UE 1710 that is subject to interference from a hidden node (i.e., the Wi-Fi TX 1705).

Related operations of an LTE-U eNB and a UE are shown in FIG. 17B.

When data is generated that the LTE-U eNB 1715 should transmit to the UE 1710 in the channel, a state of which the LTE-U eNB 1715 has detected as an idle state, the LTE-U eNB 1715 may provide listen-before-talk (LBT) information to the UE 1710 through a PCell that operates in a licensed band.

The LBT information may be transmitted by a sensing indicator including information elements illustrated in Table 6.

Table 6 illustrates the contents of the sensing indicator that can be used in embodiments of the second method.

TABLE 6

| Item | Value | Remarks |
| --- | --- | --- |
| Sensing initiation time | M-th symbol in N-th subframe, or M-th subfraem in N-th frame | |
| Sensing duration | L symbols or L subframes | |
| Busy/idle criterion | X dBm (threshold) | This value is static so that it does not need to be sent in every sensing indicator<br>Not required if it is defined as a system parameter, but required if it is a value that can be set by each eNB. |
| Sensing channel ID | SCell ID operating in the unlicensed band | Not required if UE uses one SCell.<br>Required if UE uses multiple SCells. |
| UE ID | Destination UE ID whose data is arrived at eNB | Not required if sensing indicator is transmitted to specific UE through dedicated signaling. |
| Sensing period | P subframes | Period in which UE performs channel sensing in every P subframes |
| Averaging period | A subframes or K measured RSSI samples | Average the reporting measurements in every R subframes, and make a report without averaging if K = 1. |
| Reporting period | R subframes | Make a report in every R subframes |
| Sensing subcarrier | Subcarrier set | |
| Sensing resource block | Specific subcarrier position or specific time-frequency resource block index, or all subcarriers (full bandwidth) | ID or index specifying the position of a time-frequency resource block |

Depending on the implementation, some or all of the information illustrated in Table 6 may be optionally included in the sensing indicator. The sensing indicator may include at least one of information about a channel for which a UE should perform sensing, sensing initiation time, sensing duration, information about a UE that should perform sensing, sensing period, averaging period, reporting period, sensing subcarrier, and sensing resource block. The sensing indicator may be broadcasted to all UEs in the cell through a downlink of the PCell, or may be transmitted to each UE in a unicast manner. The sensing indicator may further include information (i.e., UE ID) about the UE that should perform sensing. However, if the sensing indicator is transmitted in a unicast manner, the sensing indicator may not include the UE ID. For example, if the sensing indicator is broadcasted, the sensing indicator may be transmitted over a PDSCH, and if the sensing indicator is transmitted in a unicast manner, the sensing indicator may be transmitted over a physical downlink control channel (PDCCH).

The LBT information that the LTE-U eNB 1715 transmits to the UE 1710 may include at least one of listening initiation time and listening duration. The listening initiation time and the listening duration may be indicated by the sensing initiation time information and the sensing duration information included in the sensing indicator, respectively. As for the listening initiation time, the same value is applied to the LTE-U eNB 1715 and the UE 1710. However, as for the listening duration, either the same value or a different value may be applied to the LTE-U eNB 1715 and the UE 1710.

The LTE-U eNB 1715 and the UE 1710 may perform channel sensing during their listening durations (1720 and 1722, respectively) starting from the listening initiation time 1730.

If the LTE-U eNB 1715 continuously detects the channel state as an idle state during the given listening duration 1720 starting from the listening initiation time 1730, the LTE-U eNB 1715 may perform downlink transmission as shown by reference numeral 1732 after the listening duration 1720 is terminated.

If the UE 1710 detects the channel state as a busy state during the given listening duration 1722 as shown by reference numeral 1734, the UE 1710 may transmit a certain uplink signal to the LTE-U eNB 1715 at the uplink transmission time 1736 of the PCell, which is nearest from the detection time 1734. In other words, by transmitting a certain uplink signal, the UE 1710 may inform the eNB that a node hidden in the vicinity of the UE itself has initiated the transmission. Herein, the certain signal that is transmitted through the PCell uplink will be referred to as a "busy indicator".

If the LTE-U eNB 1715 has detected a busy state while sensing the channel during a given listening duration starting from the listening initiation time, the LTE-U eNB 1715 may stop the transmission and defer the transmission to the next transmission opportunity.

Further, if the LTE-U eNB 1715 has received a busy indicator through the PCell uplink, the LTE-U eNB 1715 may perform rescheduling as shown by reference numeral 1738. Specifically, the LTE-U eNB 1715 may schedule other UEs, excluding the UE 1710 that has transmitted the busy indicator from the scheduling starting from the LTE-U (i.e., an SCell of the unlicensed band) downlink transmission time nearest from the time that the LTE-U eNB 1715 has received the busy indicator, or may withdraw the resources from the UE 1710 that has transmitted the busy indicator and further allocate the withdrawn resources to UEs that have already been scheduled.

By controlling so as not to perform downlink transmission to the UE 1710 affected by the hidden node, the LTE-U eNB 1715 may more efficiently use the wireless resources of the unlicensed band.

Figure 18A:
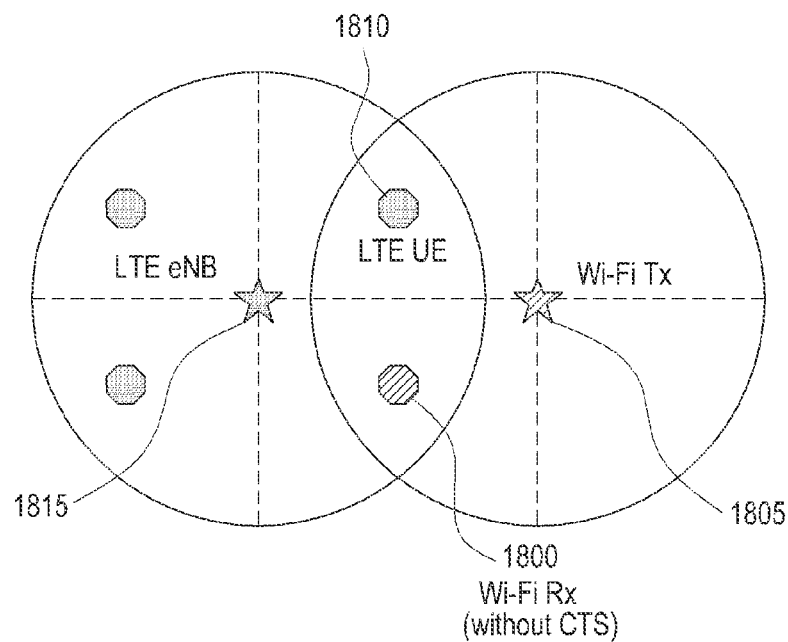
FIGS. 18A and 18B illustrate a situation in which some of a plurality of UEs scheduled by an LTE-U eNB exist in a range of a Wi-Fi TX that the eNB has failed to detect, and a downlink control operation according to a second embodiment of the second method of the present disclosure.
Figure 18B:
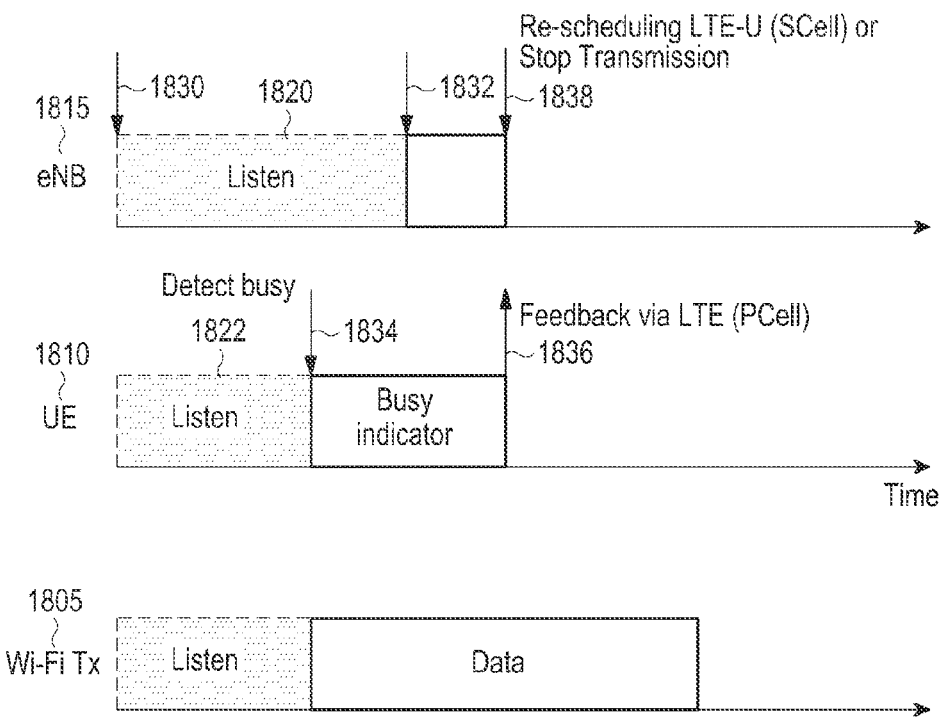

FIGS. 18A and 18B illustrate a situation in which some of a plurality of UEs scheduled by an LTE-U eNB exist in a range of a Wi-Fi TX that the eNB has failed to detect, and a downlink control operation according to a second embodiment of the second method of the present disclosure.

Referring to FIG. 18A, a Wi-Fi TX 1805 may exist out of the transmission range of an LTE-U eNB 1815, and a Wi-Fi RX 1800 and may exist in the transmission range of the LTE-U eNB 1815. In this case, like in the situation of FIG. 17A, since the LTE-U eNB 1815 fails to detect the Wi-Fi TX 1805, the LTE-U eNB 1815 will perform downlink transmission to an LTE UE 1810. However, the LTE UE 1810 that is subject to interference from the Wi-Fi TX 1805 is highly unlikely to successfully receive a signal that the LTE-U eNB 1815 has transmitted to the LTE UE 1810. Furthermore, the Wi-Fi RX 1800 that is receiving a signal from the Wi-Fi TX 1805 may be subject to interference by the downlink transmission from the LTE-U eNB 1815. Therefore, the downlink transmission of the LTE-U eNB 1815 may not be useful for both of the LTE UE 1810 that is subject to interference from the Wi-Fi TX 1805, and the Wi-Fi RX 1800, and may cause damage to the LTE UE 1810 and the Wi-Fi RX 1800. In this case, it is advantageous for the LTE-U eNB 1815 not to perform LTE-U downlink transmission.

A procedure in which the LTE-U eNB 1815 does not perform transmission in a situation where the downlink transmission of the LTE-U eNB 1815 may cause damage to both of the LTE UE 1810 and the Wi-Fi RX 1800 will be described in FIG. 18B.

Referring to FIG. 18B, when data is generated that the LTE-U eNB 1815 should transmit to the UE 1810 in the channel, a state of which the LTE-U eNB 1815 has detected as an idle state, the LTE-U eNB 1815 may provide LBT information to the UE 1810 through a PCell that operates in a licensed band. The LBT information may be transmitted by a sensing indicator including information elements illustrated in Table 6.

The LTE-U eNB 1815 and the UE 1810 may perform channel sensing during their listening durations (1820 and 1822, respectively) starting from the listening initiation time 1830.

If the LTE-U eNB 1815 continuously detects the channel state as an idle state during the given listening duration 1820 starting from the listening initiation time 1830 indicated by the LBT information, the LTE-U eNB 1815 may perform downlink transmission as shown by reference numeral 1832 after the listening duration 1820 is terminated.

If the UE 1810 detects the channel state as a busy state during the given listening duration 1822 as shown by reference numeral 1834 starting from the listening initiation time 1830, the UE 1810 may transmit a busy indicator at an uplink transmission time 1836 of the PCell, which is nearest from the detection time 1834.

If the LTE-U eNB 1815 has detected a busy state while sensing the channel during a given listening duration starting from the listening initiation time, the LTE-U eNB 1815 may stop the transmission and defer the transmission to the next transmission opportunity.

Further, even if the LTE-U eNB 1815 has received a busy indicator through the PCell uplink, the LTE-U eNB 1815 may stop the transmission as shown by reference numeral 1838 and defer the transmission to the next transmission opportunity. This is because in the situation of FIG. 18A, the downlink transmission of the LTE-U eNB 1815 may not be successfully received at the LTE UE 1810 that is subject to interference from the Wi-Fi TX 1805, and may cause damage even to the Wi-Fi RX 1800 that is presently receiving data from the Wi-Fi TX 1805.

A description will be made of an embodiment in which an eNB initiates downlink transmission by an LTE-U UE.

Figure 19:
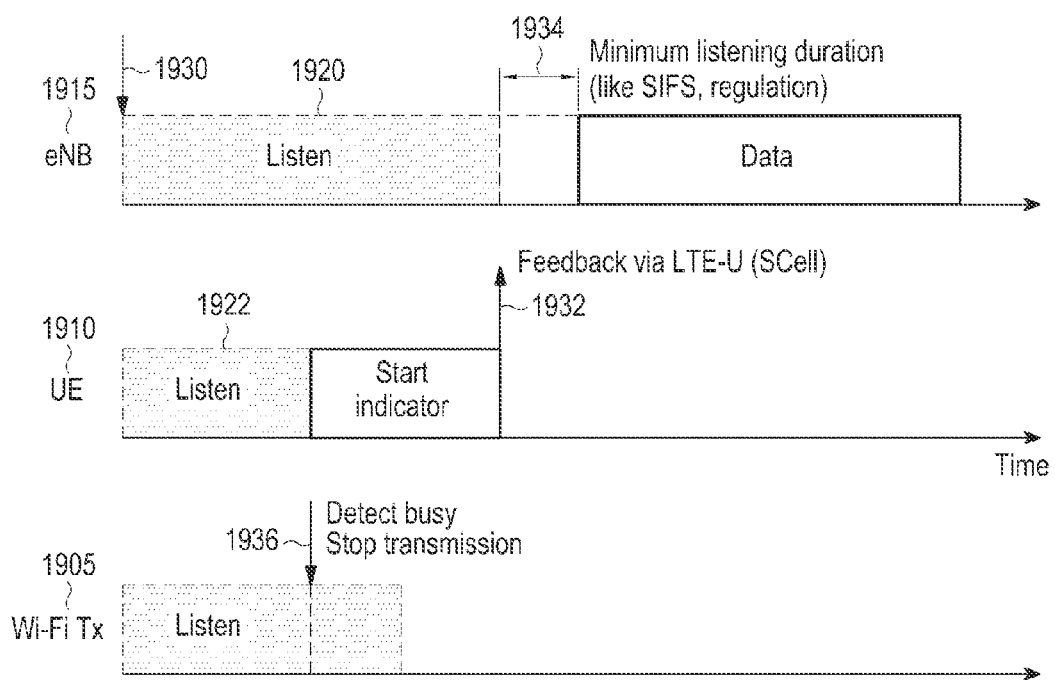
FIG. 19 illustrates a downlink transmission operation of an eNB, which is initiated by an LTE-U UE according to a third embodiment of the second method of the present disclosure.

FIG. 19 illustrates a downlink transmission operation of an eNB, which is initiated by an LTE-U UE according to a third embodiment of the second method of the present disclosure.

Referring to FIG. 19, a hidden node that an LTE-U eNB cannot detect but a UE can detect, may exist in an unlicensed band. If the UE performs arbitrary transmission earlier than the hidden node in a channel of the unlicensed band, the hidden node may stop or defer the transmission by detecting the channel state as a busy state due to the transmission of the UE. If the LTE-U eNB performs downlink transmission in the channel right after the UE performs the arbitrary transmission, the LTE-U eNB may transmit data to the UE without suffering damage caused by the hidden node, nor causing damage to the hidden node.

Related operations of an LTE-U eNB and a UE are shown in FIG. 19.

If data is generated that an LTE-U eNB 1915 should transmit to a UE 1910 after detecting the channel state as an idle state, the LTE-U eNB 1915 may provide LBT information to the UE 1910 through a PCell that operates in a licensed band. The LBT information may be transmitted by a sensing indicator including information elements illustrated in Table 6.

The LTE-U eNB 1915 and the UE 1910 may perform channel sensing during a given listening duration 1920 starting from a listening initiation time 1930 indicated by the LBT information. A listening duration 1922 applied to the UE 1910 may be set to be shorter than the listening duration 1920 applied to the LTE-U eNB 1915.

If the UE 1910 continuously detects the channel state of the unlicensed band as an idle state during the given listening duration 1922 starting from the listening initiation time 1930, the UE 1910 may inform that there is no transmission by a hidden node up to now, by transmitting a specific signal to the LTE-U eNB 1915 over a channel (i.e., an SCell) of the unlicensed band as soon as the listening duration 1922 is terminated. Herein, the specific signal that the UE 1910 transmits over a channel of the unlicensed band after detecting the idle state will be referred to as a "start indicator".

If the LTE-U eNB 1915 receives a start indicator 1932 over the channel while detecting the channel state of the unlicensed band as an idle state starting from the listening initiation time 1930, the LTE-U eNB 1915 may perform downlink data transmission over the channel after a lapse of the minimum empty channel duration 1934 determined by the regulation of the standard.

For example, the minimum empty channel duration may be a minimum listening duration, such as a short interframe space (SIFS). For reference, in some regulations applied to the unlicensed band, it is provided that after transmission of a device over the channel of the unlicensed band is terminated, any device may not perform transmission in the channel for a certain period of time. In embodiments of the present disclosure, the time for which any device may not perform transmission in the channel will be referred to as an "empty channel duration".

A hidden node (i.e., a Wi-Fi TX 1905) in the vicinity of the UE 1910 may detect a state of the channel in the unlicensed band as a busy state 1936 by the start indicator, and defer the transmission. Further, since the LTE-U eNB 1915 performs downlink transmission in the channel right after the empty channel duration after transmission of the start indicator by the UE 1910 is terminated, the LTE-U eNB 1915 may secure an opportunity to use the channel before the hidden node in the vicinity of the UE 1910 starts the transmission. Therefore, the LTE-U eNB 1915 may successfully transmit data to the UE 1910 scheduled by the LTE-U eNB 1915, without causing damage (or interference) to other Wi-Fi devices.

Figure 20:
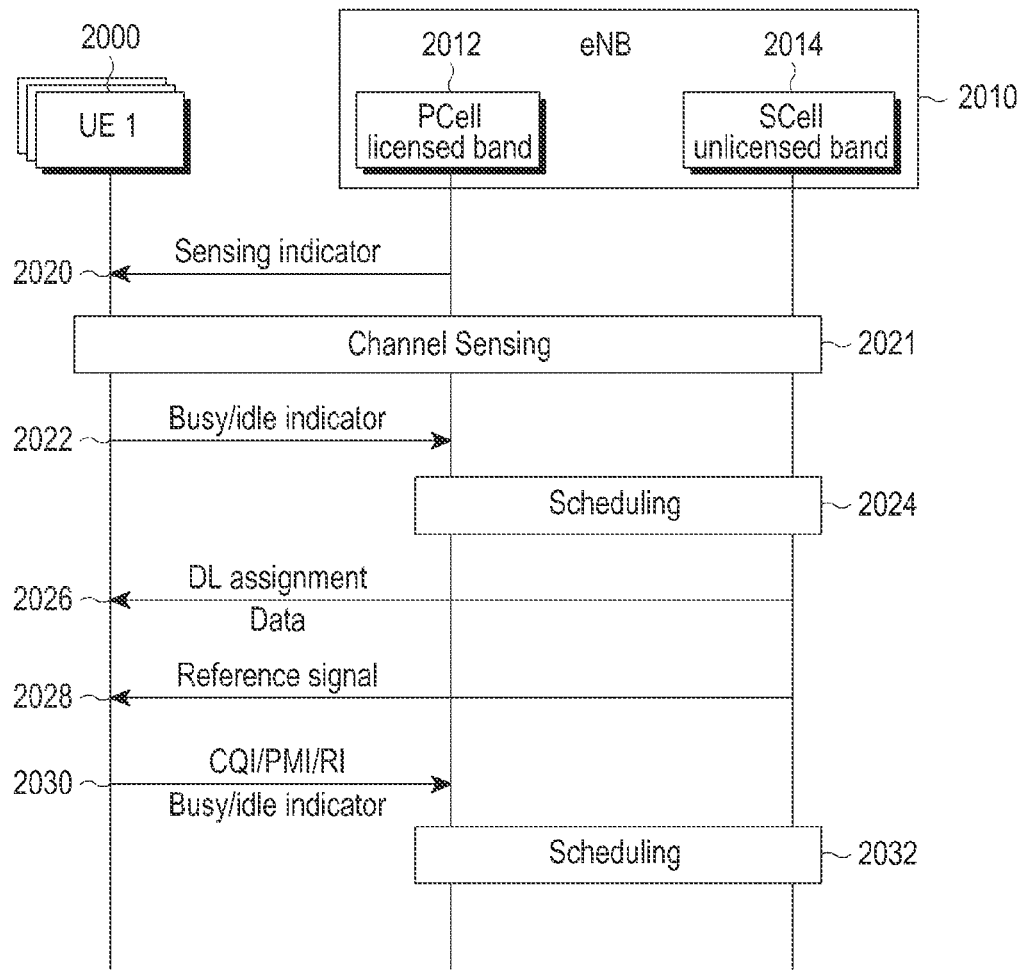
FIG. 20 illustrates a method in which an eNB and a UE perform channel sensing and the eNB reflects the sensing result fed back from the UE in scheduling according to embodiments of the second method of the present disclosure.

FIG. 20 illustrates a method in which an eNB and a UE perform channel sensing and the eNB reflects the sensing result fed back from the UE in scheduling according to various embodiments of the second method of the present disclosure.

Referring to FIG. 20, if downlink data to be transmitted to a UE 2000 is arrived at an eNB 2010 from the core network and the eNB 2010 detects a state of the channel (i.e., an SCell) of the unlicensed band as an idle state, the eNB 2010 may indicate channel sensing (LBT operation) by transmitting a sensing indicator to the UE 2000 in operation 2020.

The sensing indicator may include the information elements illustrated in Table 6. Specifically, the sensing indicator may include at least one of information about a channel for which an eNB and a UE should perform sensing, sensing initiation time, sensing duration, information about a UE that should perform sensing, sensing period, averaging period, reporting period, sensing subcarrier, and sensing resource block. The sensing indicator may be broadcasted to all UEs in the cell through a downlink of a PCell 2012, or may be transmitted to each UE in a unicast manner. If the sensing indicator is transmitted in a unicast manner, the sensing indicator may not include information (i.e., UE ID) about the UE that should perform channel sensing.

When performing an LBT operation (i.e., a channel sensing), the eNB 2010 may not transmit a reference signal such as CRS. Therefore, during the period in which the channel sensing is performed, it is not possible for the eNB 2010 or the UE 2000 to detect a hidden node through signal quality measurement for CRS and channel quality indicator (CQI) feedback. Therefore, in an embodiment of the present disclosure, during channel sensing duration, the UE 2000 may perform sensing and feed back the sensing result (i.e., the channel occupancy state information or the measured magnitude or RSSI value of an interference signal) in operation 2022, allowing the eNB 2010 to use the sensing result in scheduling.

Upon receiving the sensing indicator, the UE 2000 may perform channel sensing (or an LBT operation) during the sensing duration starting from a given sensing initiation time in operation 2021, and transmit the sensing result to the eNB 2010 through the PCell uplink in operation 2022. The sensing result may be the above-described busy indicator or idle indicator. The busy indicator or idle indicator may include the channel sensing results (i.e., the channel occupancy state information or the measured magnitude or RSSI value of an interference signal). Alternatively, if the UE 2000 desires to trigger downlink transmission of the unlicensed band, the UE 2000 may transmit a start indicator to the eNB 2010 over an uplink channel (i.e., an SCell) of the unlicensed band.

The eNB 2010 may schedule downlink transmission over a channel of the unlicensed band, targeting a UE in the idle state, excluding the UE that has received the sensing result of the UE 2000 and reported it as a busy state, in operation 2024. Alternatively, the eNB 2010 may schedule downlink transmission over a channel of the unlicensed band to the UE that has transmitted a start indicator.

If the eNB 2010 has continuously detected the channel state as an idle state during the sensing duration starting from the sensing initiation time, the eNB 2010 may perform downlink data transmission over the channel in operation 2026 as soon as the eNB 2010 performs scheduling in operation 2024.

After securing the rights to use the channel after the LBT operation 2021, the eNB 2021 may operate in the same way as the typical LTE eNB. Specifically, the eNB 2010 may periodically transmit a reference signal, such as CRS in every subframe in an SCell 2014 in service, in operation 2028. The UE 2000 may measure a CQI by measuring the quality of the CRS transmitted from the eNB 2010, and feedback the CQI through the PCell 2012 in operation 2030. Further, the UE 2000 may determine the busy/idle state for the channel in use through the measurement of an interference signal and may transmit a busy indicator/idle indicator to the eNB 2010, in operation 2030. The busy indicator or idle indicator may include the channel sensing results (i.e., the channel occupancy state information or the measured magnitude or RSSI value of an interference signal).

On the other hand, according to the LTE standard, a CQI feedback interval of a UE may have a value of 2 ms or more (e.g., 2, 5, 10, 20, 40, 80, 160, 32, 64, or 128 ms). Therefore, the CQI alone may not be enough as the information to be used for unlicensed band scheduling of the eNB. In other words, the UE may perform transmission of the busy indicator/idle indicator even if the subframe is not a first subframe in which an LBT operation is performed, so that the busy indicator/idle indicator may be used for unlicensed band channel scheduling of the eNB. The busy indicator or idle indicator may include the channel sensing results (i.e., the channel occupancy state information or the measured magnitude or RSSI value of an interference signal).

The eNB 2010 may perform re-scheduling using the received CQI feedback or busy indicator/idle indicator in operation 2032.

If the eNB 2010 considers the CQI and the busy indicator/idle indicator together, the following situations may occur.

A first situation is a situation in which the channel state measured by the UE 2000 is changed from idle to busy. In this case, the UE 2000 is expected to subject to significant interference from its nearby Wi-Fi TX. Therefore, the UE 2000 may transmit a busy indicator to the eNB 2010, and stop the CQI feedback until the UE 2000 detects an idle channel. Further, if the UE 2000 that has reported the idle indicator stops the CQI feedback while transmitting a busy indicator, the eNB 2010 may exclude the UE 2000 from the scheduling.

A second situation is a situation in which the channel state measured by the UE 2000 is changed from busy to idle. In this case, it is expected that the UE 2000 has escaped from interference from its nearby Wi-Fi TX. Therefore, the UE 2000 may transmit an idle indicator to the eNB 2010, measure CRS, and start again CQI feedback. Further, if the UE 2000 that has reported the busy indicator performs CQI feedback while transmitting the idle indicator, the eNB 2010 may include the UE 2000 in the scheduling.

In operations of the above two situations, in a case where the UE has detected the busy state, the channel quality between the eNB and the UE is assumed to be low due to interference caused by the nearby Wi-Fi TX. However, in some cases, even though the UE has detected the busy state as a result of channel detection, the CQI which is the CRS measurement result may not be poor.

Figure 21:
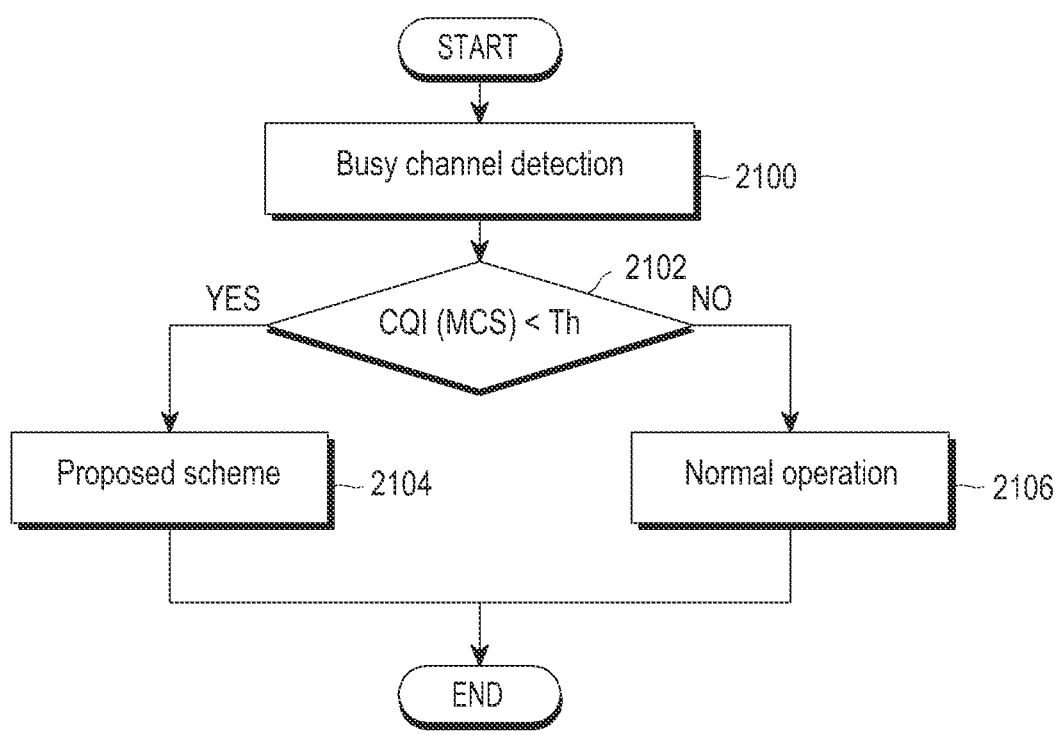
FIG. 21 illustrates a method of selectively applying an operation applied after an listen-before-talk (LBT) operation depending on a channel quality indicator (CQI) and a busy/idle indicator according to various embodiments of the second method of the present disclosure.

Therefore, as in FIG. 21, the eNB may exclude the UE that has reported a busy indicator, from the scheduling, only if the CQI is less than or equal to a certain threshold. Otherwise, the eNB may not exclude the UE from the scheduling.

FIG. 21 illustrates a method of selectively applying an operation applied after an LBT operation depending on a CQI and a busy/idle indicator according to various embodiments of the second method of the present disclosure.

Referring to FIG. 21, if a busy indicator is fed back from a UE that has sensed the channel state as a busy state after an LBT operation in operation 2100, an eNB may compare a CQI reported from the UE with a threshold in operation 2102.

If the CQI of the UE that has reported the busy indicator is less than the threshold, the eNB may apply the method (i.e., a method of excluding the UE from the scheduling) proposed in embodiments of the present disclosure in operation 2104. On the other hand, if the CQI of the UE that has reported the busy indicator is greater than or equal to the threshold, the eNB may apply the normal method (i.e., a method of not excluding the UE from the scheduling) in operation 2106.

In other words, the eNB's rescheduling operation based on the busy indicator, which is proposed in embodiments of the present disclosure, may be operated to be applied only if the channel quality is deteriorated lower than a threshold due to the strong interference from the UE.

Figure 22:
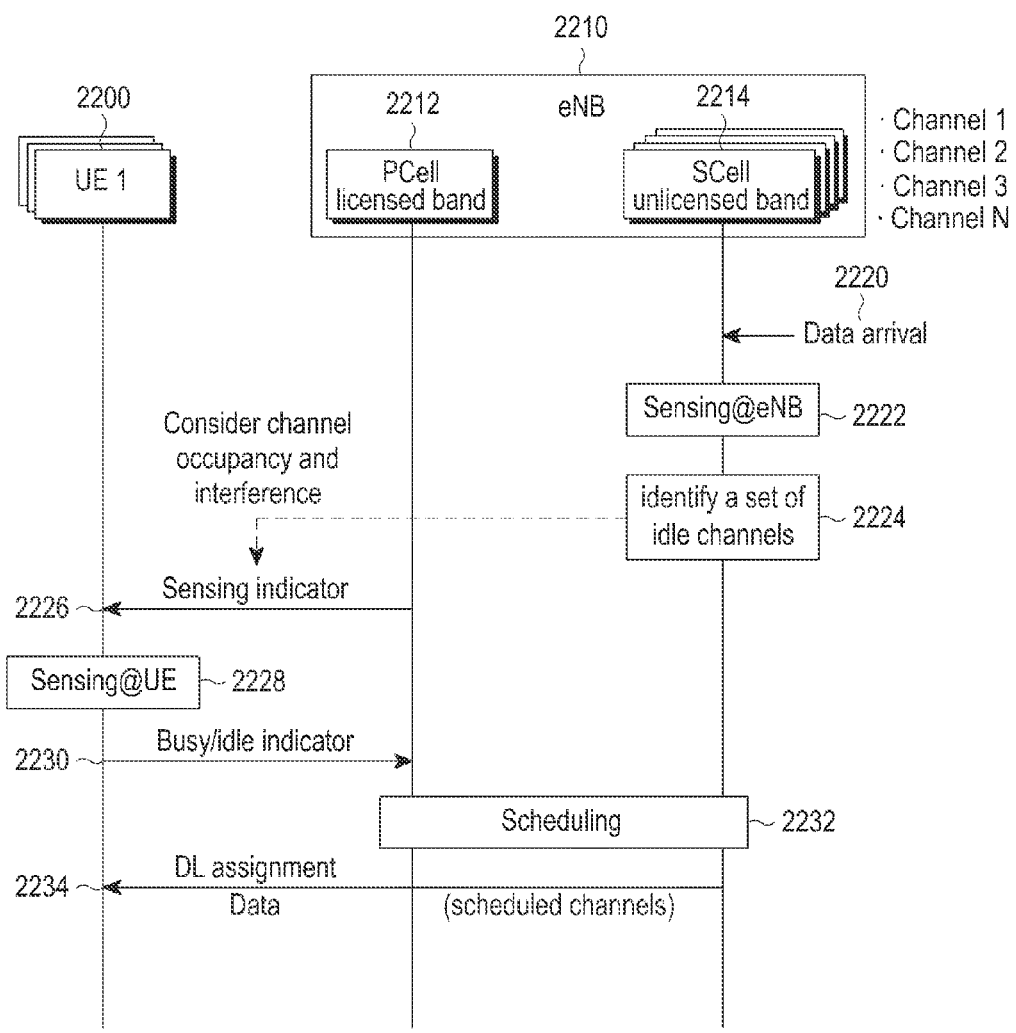
FIG. 22 illustrates a sensing indicator that is provided to a UE by an eNB when the UE has set multiple channels of an unlicensed band as an SCell, and a usage thereof according to various embodiments of the second method of the present disclosure.

FIG. 22 illustrates a sensing indicator that is provided to a UE by an eNB when the UE has set multiple channels of an unlicensed band as an SCell, and a usage thereof according to various embodiments of the second method of the present disclosure.

Referring to FIG. 22, a UE 2200 may set one or more channels existing in an unlicensed band as an SCell 2214.

If data to be transmitted to the UE 2200 is arrived at an eNB 2210 in operation 2220, the eNB 2210 may perform channel sensing for one or more SCells 2214 in operation 2222, and identify one or more SCells in the idle state, in operation 2224. The eNB 2210 may transmit priority information for one or more SCells through a PCell 2212 using a sensing indicator message in operation 2226. The sensing indicator may further include an information element such as 'sensing channel priority' in addition to the information elements illustrated in Table 6. The priority for the SCell may be determined based on the channel occupancy ratio or the average interference value of each SCell, which is identified by the eNB 2210. The average interference value may mean an average transmission power level of an interference signal, and its unit may be dBm.

Upon receiving the sensing indicator message, the UE 2200 may sense the channel based on the priority included in the sensing indicator in operation 2228.

The UE 2200 may feed a busy indicator or an idle indicator back to the eNB 2210 through the PCell 2212, as a result of the channel sensing in operation 2230.

The eNB 2210 may schedule one or more SCell for the UE 2200 using the sensing result information (2230) fed back from the UE 2200, in operation 2232, and transmit data through the scheduled SCell in operation 2234.

Figure 23:
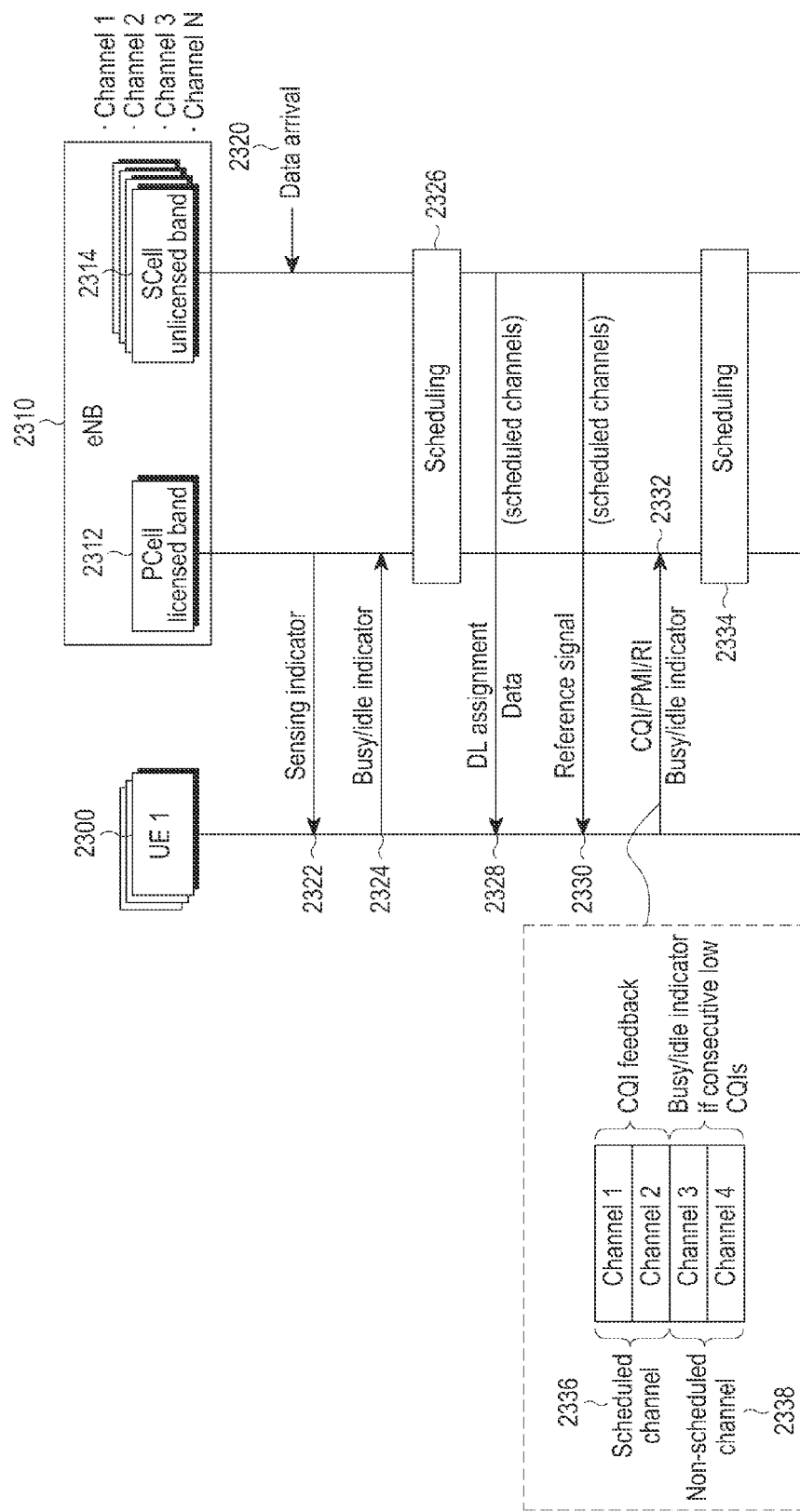
FIG. 23 illustrates an operation in which when multiple channels of an unlicensed band are set as an SCell, a CQI is fed back for a scheduled channel and a busy/idle indicator is fed back for an unscheduled channel according to various embodiments of the second method of the present disclosure.

FIG. 23 illustrates an operation in which when multiple channels of an unlicensed band are set as an SCell, a CQI is fed back for a scheduled channel and a busy/idle indicator is fed back for an unscheduled channel according to various embodiments of the second method of the present disclosure.

Referring to FIG. 23, a UE 2300 may set one or more channels existing in an unlicensed band as an SCell 2314.

If data to be transmitted to the UE 2300 is arrived at an eNB 2310 in operation 2320, the eNB 2310 may transmit a sensing indicator to the UE 2300 in operation 2322, to indicate channel sensing.

Upon receiving the sensing indicator message, the UE 2300 may sense the channel based on the sensing indicator, and feed a busy indicator or an idle indicator back to the eNB 2310 through a PCell 2312, as a result of the channel sensing in operation 2324. The busy indicator or idle indicator may include the channel sensing results (i.e., the channel occupancy state information or the measured magnitude or RSSI value of an interference signal) measured by the UE.

The eNB 2310 may schedule one or more SCells for the UE 2300 using the sensing result information (2324) fed back from the UE 2300, in operation 2326, and transmit data through one or more scheduled SCells in operation 2328.

Depending on the size of the data that the eNB 2310 should transmit to the UE 2300, in some of 1 to N SCells, data transmission may be made since they are scheduled, and in some other SCells, data transmission may not be made since they are not scheduled. In some SCells in which data transmission is made since they are scheduled, a reference signal, such as CRS, may be transmitted in operation 2330. In unscheduled (or non-scheduled) SCells, all signals including CRS may not be transmitted. In this situation, the UE 2300 may perform the following operations.

After measuring CRS for an SCell in which transmission is presently made, if the UE 2300 determines that the channel quality is not good, it may be preferable for the UE 2300 to perform communication through another SCell in which transmission is not presently made. If it is determined that a CQI for the SCell in which transmission is presently made is lower than a threshold, the UE 2300 may perform channel sensing for the SCell in which transmission is not presently made and transmit one or more of a CQI, a busy indicator and an idle indicator to the eNB 2310 in order to inform the eNB 2310 of the determination, in operation 2332.

The CQI is information about an SCell 2336 in which transmission is presently made since it is scheduled, and the busy indicator or idle indicator is information about an unscheduled SCell 2338.

Upon receiving at least one of the CQI, busy indicator and idle indicator, the eNB 2310 may determine to transmit data to the UE 2300 using another SCell, and schedule the SCell in operation 2334.

Figure 24:
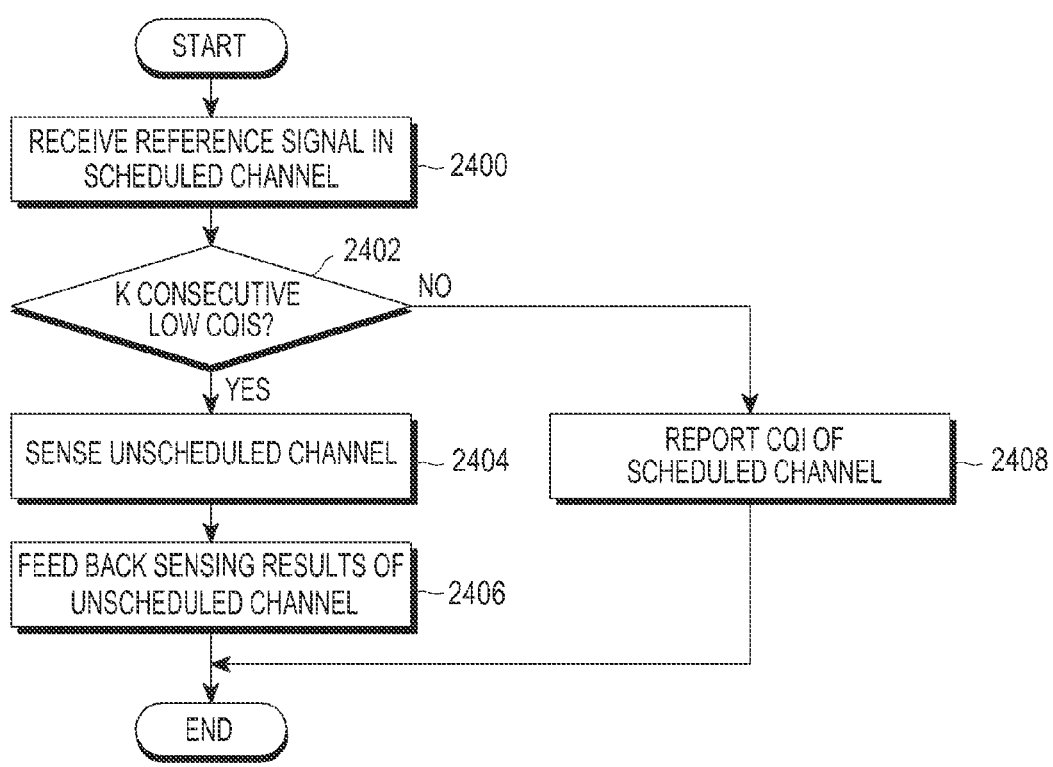
FIG. 24 illustrates a UE's operation of feeding back a CQI and a busy/idle indicator when the UE has set multiple channels of an unlicensed band as an SCell according to various embodiments of the second method of the present disclosure.

FIG. 24 illustrates a UE's operation of feeding back a CQI and a busy/idle indicator when the UE has set multiple channels of an unlicensed band as an SCell according to various embodiments of the second method of the present disclosure.

FIG. 24 is provided to describe the operation 2332 of feeding back one or more of the CQI, the busy indicator and the idle indicator of the UE in FIG. 23.

Referring to FIG. 24, in operation 2400, the UE may receive a reference signal through a scheduled SCell and determine the channel quality (CQI) by measuring the received reference signal.

In operation 2402, the UE may check (or determine) whether a case where a periodically measured CQI has a value lower than a threshold occurs k times consecutively.

If it is determined in operation 2402 that k consecutive CQIs have a value lower than the threshold, the UE may sense another unscheduled SCell in operation 2404, and feed back the sensing results of the unscheduled SCell to the eNB in operation 2406. Optionally, the UE may feed back the sensing results of only some SCells whose sensing results are an idle state.

If it is not determined in operation 2402 that k consecutive CQIs have a value lower than the threshold, the UE may feedback the CQI information of only the scheduled SCell in operation 2408.

From the perspective of the UE, a plurality of channels operated by the eNB may be divided into scheduled channels and unscheduled channels. The term 'scheduled channel' may refer to a channel that is added to a UE by an eNB and activated for use by the UE. Further, the term 'unscheduled channel' may refer to a channel that is added to a UE by an eNB, but not activated yet, or a channel that is not added to the UE yet.

Referring to FIGS. 22 to 24, a scheduling operation for the channel that is added to a UE but not activated has been described. Specifically, in the operation described in FIG. 24, after the UE receives a reference signal in a scheduled channel (i.e., a channel that is activated after being added), if k consecutive low CQIs are observed as a result of the channel measurement, the UE may feed back the sensing results for the currently unscheduled channel (i.e., a channel that is added to the UE but not activated yet).

Even though the eNB desires to transmit a reference signal in a scheduled channel (i.e., a channel that is added and activated), if the eNB cannot transmit the reference signal since the eNB has determined the channel state as a busy state, the UE cannot receive not only the reference signal but also any signals, such as resource allocation information and data from the eNB through the scheduled channel. Therefore, if this phenomenon continues too long, the UE should change the channel (i.e., activate a new channel), and perform communication with the eNB through another channel. In this case, the UE may request activation of a new channel by performing operations as in FIG. 25.

Figure 25:
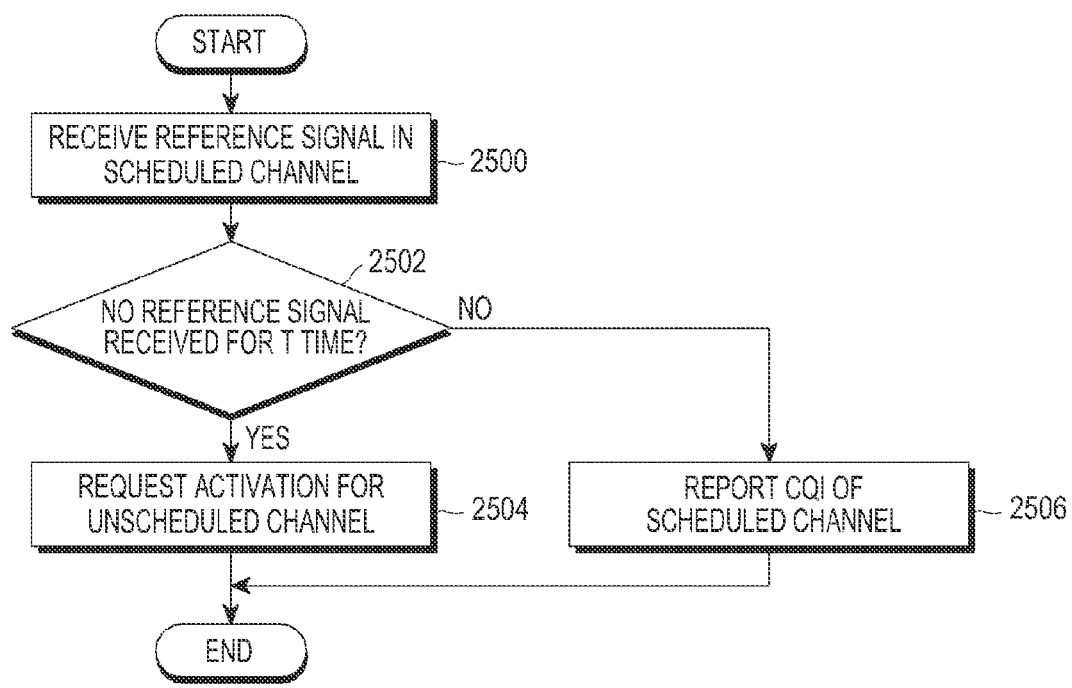
FIG. 25 illustrates a UE's operation of requesting an SCell activation based on reception/non-reception of a reference signal when the UE has set multiple channels of an unlicensed band as an SCell according to various embodiments of the second method of the present disclosure.

FIG. 25 illustrates a UE's operation of requesting an SCell activation based on reception/non-reception of a reference signal when the UE has set multiple channels of an unlicensed band as an SCell according to various embodiments of the second method of the present disclosure.

Referring to FIG. 25, in operation 2500, the UE may receive a reference signal in a scheduled channel (i.e., a channel that is added and activate).

After receiving the reference signal, the UE may check (or determine) in operation 2502 whether a new reference signal is not received until a certain time T elapses. For example, if the reference signal is received in operation 2500, the UE may activate a timer to check whether the certain time has elapsed. If a new reference signal is received during operation of the timer, the UE may reset the timer. Information indicating the certain time T may be determined by the eNB, and the eNB may inform the UE of the information indicating the T in advance.

After a reference signal is received, if a new reference signal is not received until the certain time T elapses, the UE may request the eNB to activate a new unscheduled channel in operation 2504. The activation for a new channel may be performed in various ways. As an example, the UE may request activation of the unscheduled channel by sensing the unscheduled channel and feeding back the sensing result to the eNB. As another example, the UE may request activation of the unscheduled channel by receiving a reference signal in the unscheduled channel and feeding back CQI information to the eNB. As another example, the UE may request activation of a new channel by transmitting an activation indicator for requesting activation of the new channel for the UE, to the eNB. The activation indicator may include identifier information of the channel (or SCell).

In operation 2506, the UE may report CQI information for the scheduled channel, in a situation where after a reference signal is received, a new reference signal is received before the certain time T elapses.

The third method of the present disclosure regarding transmission power control of the LTE-U eNB will be described below.

In order for the LTE-U system to effectively share the unlicensed band with other wireless communication devices (e.g., Wi-Fi or other LTE-U systems), it is preferable to use appropriate (not too high) transmission power so as not to cause excessive interference to other wireless communication devices. To this end, the present disclosure proposes the third method of controlling the transmission power of the LTE-U eNB by utilizing the sensing results of the UE, which have been described in the first and second methods.

Figure 26:
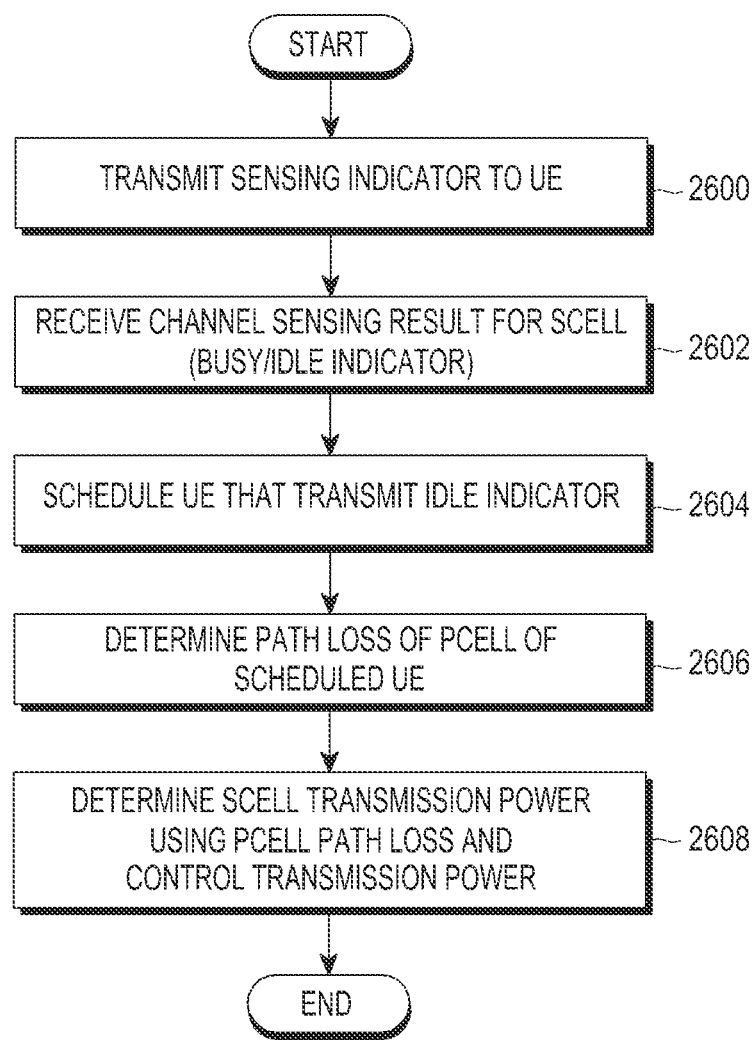
FIG. 26 illustrates an eNB's operation of determining transmission power of an SCell using a sensing result report of a UE according to various embodiments of a third method of the present disclosure.

A procedure of the third method will be illustrated in FIG. 26.

FIG. 26 illustrates an eNB's operation of determining transmission power of an SCell using a sensing result report of a UE according to various embodiments of a third method of the present disclosure.

Referring to FIG. 26, if downlink data to be transmitted to a UE is arrived at an eNB and the eNB is presently detecting an idle channel, the eNB may transmit a sensing indicator to the UE through a PCell in operation 2600.

In operation 2602, the eNB may receive sensing results through a PCell uplink from the UE that has performed sensing during sensing duration starting from the sensing initiation time indicated by the sensing indicator. The received sensing results may be a busy or idle state, or may be the magnitude or RSSI value of an interference signal, which is measured by the UE.

In operation 2604, by receiving the detection results of the UE, the eNB may perform scheduling, targeting a UE in the idle state, excluding a UE in the busy state.

In operation 2606, the eNB may determine a path loss of a PCell (i.e., a primary carrier operating in a licensed band) for a scheduled UE.

In operation 2608, the eNB may determine transmission power for an SCell (i.e., a secondary carrier operating in an unlicensed band) so that a UE having the largest path loss for a PCell may receive certain power, and control transmission power of the eNB with the determined transmission power for the SCell.

The path loss may be mainly affected by the carrier frequency and the regional transmission/reception environment. In the LTE-U system, since a PCell operating in a licensed band through CA and an SCell operating in an unlicensed band coexist in one eNB, the PCell and the SCell may seem to be similar to each other in terms of the influence that the transmission/reception environment of a specific region exerts on a path loss. Therefore, the eNB may derive an SCell path loss from a PCell path loss, if a path loss difference by a carrier frequency different between the PCell and the SCell is known.

Through the theories and experiments, the eNB may determine the difference in path loss due to the difference in carrier frequency by a known method. Alternatively, the eNB may receive PCell received signal strength and SCell received signal strength fed back from the UE, and compare the PCell received signal strength with the SCell received signal strength to determine the difference in path loss.

Therefore, the LTE-U eNB may determine the transmission power for the SCell that is operating in the unlicensed band, using the following Equation (1).

$$P_{TX,SCell} = P_{RX} + (PL_{PCell} + PL_{offset})$$  Equation 1 where $P_{TX,SCell}$ represents transmission power for an SCell that is operating in an unlicensed band, $P_{RX}$ represents the power that a UE having the largest path loss for a PCell among the UEs that the LTE-U eNB has scheduled by receiving a busy/idle indicator from the UE, has received from an SCell, and corresponds to a value determined by the eNB, $PL_{PCell}$ represents a path loss that the UE experiences in the PCell, and $PL_{offset}$ represents a difference in path loss, which is caused by a carrier frequency difference between the PCell and the SCell.

Figure 27:
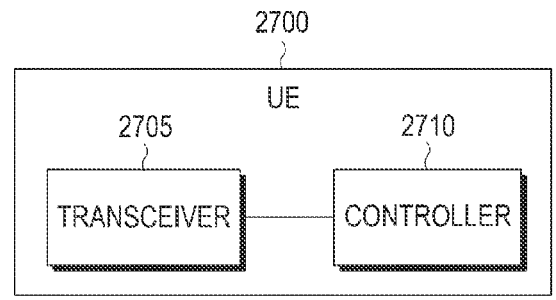
FIG. 27 illustrates a configuration of a UE according to an embodiment of the present disclosure.

FIG. 27 illustrates a configuration of a UE according to an embodiment of the present disclosure.

Referring to FIG. 27, a UE 2700 may include a transceiver 2705 for performing signal transmission/reception with an eNB, and a controller 2710 for controlling all operations of the UE 2700. In the first to third methods of the present disclosure, the operations described as UE's operations among the above-described operations may be construed to be performed under control of the controller 2710.

The controller 2710 and the transceiver 2705 should not necessarily be configured as separate components, and may be implemented as one component in the form of a single chip.

Figure 28:
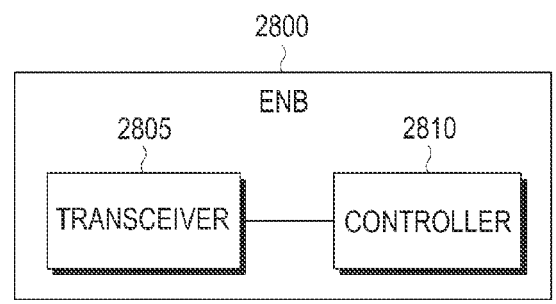
FIG. 28 illustrates a configuration of an eNB according to an embodiment of the present disclosure.

FIG. 28 illustrates a configuration of an eNB according to an embodiment of the present disclosure.

Referring to FIG. 28, an eNB 2800 may include a transceiver 2805 for performing signal transmission/reception with a UE and other entities of the network, and a controller 2810 for controlling all operations of the eNB 2800. In the first to third methods of the present disclosure, the operations described as eNB's operations among the above-described operations may be construed to be performed under control of the controller 2810.

The controller 2810 and the transceiver 2805 should not necessarily be configured as separate components, and may be implemented as one component in the form of a single chip.

It should be noted that examples of the configuration and methods of the LTE-U system, which are illustrated in FIGS. 5 to 28, are not intended to limit the scope of the present disclosure. In other words, all components or operations described in FIGS. 5 to 28 should not be construed as prerequisites for implementation of the present disclosure, and the present disclosure may be implemented by only some of the components without departing from the scope of the present disclosure.

The above-described operations may be implemented by mounting a memory device storing the relevant program code in an entity of a communication system, a function, an eNB, or any component of a UE. In other words, a controller in the entity, the function, the eNB or the UE may read the program code stored in the memory device and execute the read program code by a processor or a central processing unit (CPU), to perform the above-described operations.

Above-described various components and modules of the entity, the function, the eNB or the UE may be operated using a hardware circuit (e.g., complementary metal oxide semiconductor (CMOS)-based logic circuit), firmware, software and/or a combination of hardware, firmware and/or software embedded in a machine-readable medium. For example, various electrical structures and methods may be implemented using transistors, logic gates and electrical circuits, such as an application-specific integrated circuit (ASIC).

As is apparent from the foregoing description, according to an embodiment of the present disclosure, an LTE-U system and other system (e.g., a Wi-Fi system) using the same unlicensed band may coexist while reducing the performance degradation if possible.

The present disclosure may improve the communication success rate and the reception quality of the LTE-U system that uses an unlicensed band.

According to an embodiment of the present disclosure, even when an eNB adds an SCell to a UE, the eNB may select a channel to be added, considering the channel detection results of the eNB and the UE, thereby increasing the utilization of channel resources.

According to an embodiment of the present disclosure, an eNB and a UE may add a channel having the actually longest transmittable time as an SCell, and use the SCell, and may efficiently use the frequency resources belonging to the unlicensed band in the LTE-U system.

According to an embodiment of the present disclosure, an LTE-U eNB may successfully transmit data to a UE scheduled by the LTE-U eNB itself, without causing damage (or interference) to other Wi-Fi devices.

According to an embodiment of the present disclosure, an LTE-U eNB may perform scheduling, considering a hidden node that the LTE-U eNB itself cannot detect but a UE can detect.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a base station in a communication system, the method comprising:
   transmitting, to a user equipment (UE), a first message for a received signal strength indicator (RSSI) measurement of an unlicensed band channel, wherein the first message includes information on a subframe at which the RSSI measurement is initiated, information on a number of symbols related with the RSSI measurement, information on a periodicity for the RS SI measurement, and information on the unlicensed band channel on which the RSSI measurement is performed; and
   receiving, from the UE, a first report message including information on an unlicensed band channel occupancy and an RSSI based on the RSSI measurement on the unlicensed band channel.

2. The method of claim 1, further comprising:
   determining a first unlicensed band channel as a channel to be added, if a number of UEs, whose received unlicensed band channel occupancy is a busy state, is less than a threshold when the unlicensed band channel occupancy determined by the base station is an idle state; and
   transmitting a control message indicating addition of the first unlicensed band channel to the UE.

3. The method of claim 1, wherein the first message further includes information on a threshold to determine the unlicensed band channel occupancy of the unlicensed band channel.

4. The method of claim 1, wherein the first message is a radio resource control (RRC) connection reconfiguratio(R-RCConnectionReconfiguration) message.

5. The method of claim 1, further comprising:
transmitting, to the UE, a second message indicating a listening initiation time for a listen-before-talk (LBT) operation of the unlicensed band channel; and
receiving a second report message indicating the unlicensed band channel occupancy and an RSSI of the unlicensed band channel from the UE.

6. A method of a base station in a communication system, the method comprising:
transmitting a first message for a received signal strength indicator (RSSI) measurement of an unlicensed band channel, to at least one user equipment (UE);
determining a first unlicensed band channel occupancy by sensing the unlicensed band channel;
receiving a first report message including a second unlicensed band channel occupancy and an RSSI based on the RSSI measurement of the unlicensed band channel, from the at least one UE;
comparing the first unlicensed band channel occupancy with the second unlicensed band channel occupancy from the UE;
transmitting, to the UE, a second message indicating a listening initiation time for a listen-before-talk (LBT) operation of the unlicensed band channel;
receiving a second report message indicating a result of the LBT operation of the unlicensed band channel from the UE;
scheduling downlink transmission of the UE based on an uplink signal;
transmitting a reference signal to the UE through the unlicensed band channel;
receiving a measurement result for the reference signal from the UE; and
scheduling downlink transmission of the UE based on the measurement result for the reference signal,
wherein the measurement result for the reference signal comprises a state indicator of the unlicensed band channel.

7. The method of claim 6, wherein the scheduling of the downlink transmission of the UE based on the measurement result for the reference signal comprises:
excluding the UE from the scheduling of downlink transmission if the state indicator is a busy indicator and a channel quality indicator (CQI) is less than or equal to a threshold.

8. A method of a user equipment (UE) in a communication system, the method comprising:
receiving, from a base station, a first message for a received signal strength indicator (RSSI) measurement of an unlicensed band channel, wherein the first message includes information on a subframe at which the RSSI measurement is initiated, information on a number of symbols related with the RSSI measurement, information on a periodicity for the RS SI measurement, and information on the unlicensed band channel on which the RSSI measurement is performed;
performing the RSSI measurement on the unlicensed band channel based on the first message; and
transmitting a first report message including information on an unlicensed band channel occupancy and an RSSI based on the RSSI measurement on the unlicensed band channel.

9. The method of claim 8, wherein the first message further includes information on a threshold to determine the unlicensed band channel occupancy of the unlicensed band channel.

10. The method of claim 8, wherein the first message is a radio resource control (RRC) connection reconfiguration (RRCConnectionReconfiguration) message.

11. The method of claim 8, further comprising:
receiving, from the base station, a second message indicating a listening initiation time for a listen-before-talk (LBT) operation of the unlicensed band channel; and
transmitting a second report message indicating the unlicensed band channel occupancy and an RSSI of the unlicensed band channel, to the base station.

12. A method of a user equipment (UE) in a communication system, the method comprising:
receiving a first message for a received signal strength indicator (RSSI) measurement of an unlicensed band channel from a base station;
performing the RSSI measurement on the unlicensed band channel based on the first message;
transmitting a first report message including an unlicensed band channel occupancy and an RSSI based on the RSSI measurement on the unlicensed band channel;
receiving, from the base station, a second message indicating a listening initiation time for a listen-before-talk (LBT) operation of the unlicensed band channel;
transmitting a second report message indicating a result of the LBT operation of the unlicensed band channel;
receiving a reference signal over the unlicensed band channel; and
transmitting a measurement result for the reference signal to the base station,
wherein the measurement result for the reference signal comprises a state indicator of the unlicensed band channel.

13. A base station in a communication system, the base station comprising:
at least one processor configured to:
transmit, to a user equipment (UE), a first message for a received signal strength indicator (RSSI) measurement of an unlicensed band channel, wherein the first message includes information on a subframe at which the RSSI measurement is initiated, information on a number of symbols related with the RSSI measurement, information on a periodicity for the RSSI measurement, and information on the unlicensed band channel on which the RSSI measurement is performed, and
receive, from the UE, a first report message which including information on an unlicensed band channel occupancy and an RSSI based on the RSSI measurement on the unlicensed band channel; and
a transceiver configured to transmit and receive at least one of the messages under control of the at least one processor.

14. A user equipment (UE) in a communication system, the UE comprising:
at least one processor configured to:
receive, from a base station, a first message for a received signal strength indicator (RSSI) measurement of an unlicensed band channel, wherein the first message includes information on a subframe at which the RSSI measurement is initiated, information on a number of symbols related with the RSSI measurement, information on a periodicity for the RSSI measurement, and information on the unlicensed band channel on which the RSSI measurement is performed,
perform the RSSI measurement on the unlicensed band channel based on the first message, and transmit a first report message including information on an unlicensed band channel occupancy and an RSSI based on the RSSI measurement on the unlicensed band channel; and
a transceiver configured to transmit and receive at least one of the messages under control of the at least one processor.

* * * * *